United States Patent
Shimomura

(10) Patent No.: US 8,206,260 B2
(45) Date of Patent: Jun. 26, 2012

(54) TOROIDAL CONTINUOUSLY VARIABLE TRANSMISSION UNIT

(75) Inventor: Yuji Shimomura, Fujisawa (JP)

(73) Assignee: NSK Ltd., Tokyo (JP)

(*) Notice: Subject to any disclaimer, the term of this patent is extended or adjusted under 35 U.S.C. 154(b) by 833 days.

(21) Appl. No.: 12/306,531

(22) PCT Filed: Jun. 28, 2007

(86) PCT No.: PCT/JP2007/062979
§ 371 (c)(1),
(2), (4) Date: Dec. 24, 2008

(87) PCT Pub. No.: WO2008/001839
PCT Pub. Date: Jan. 3, 2008

(65) Prior Publication Data
US 2009/0286646 A1 Nov. 19, 2009

(30) Foreign Application Priority Data

Jun. 29, 2006 (JP) ................... 2006-180390
Sep. 1, 2006 (JP) ................... 2006-238309
Feb. 27, 2007 (JP) ................... 2007-047102
May 30, 2007 (JP) ................... 2007-142917

(51) Int. Cl.
*F16H 15/38* (2006.01)
(52) U.S. Cl. ............. 476/42; 476/40; 384/121
(58) Field of Classification Search .......... 476/40, 476/42, 46; 384/105, 121, 590
See application file for complete search history.

(56) References Cited

U.S. PATENT DOCUMENTS

| | | | |
|---|---|---|---|
| 5,575,733 A * | 11/1996 | Machida et al. | 476/40 |
| 6,413,188 B2 * | 7/2002 | Imanishi et al. | 476/72 |
| 6,416,439 B1 * | 7/2002 | Itoh et al. | 476/40 |
| 7,104,919 B2 * | 9/2006 | Kato et al. | 476/42 |
| 7,384,368 B2 * | 6/2008 | Ishikawa et al. | 476/8 |
| 7,462,128 B2 * | 12/2008 | Uchiyama et al. | 476/72 |
| 7,563,192 B2 * | 7/2009 | Imanishi et al. | 476/8 |

FOREIGN PATENT DOCUMENTS

DE 100 34 453 A1 1/2002
DE 102 39 232 A1 4/2003
(Continued)

OTHER PUBLICATIONS

German Office Action dated Mar. 16, 2010 in Application No. 11 2007 001 546.

*Primary Examiner* — David M Fenstermacher
(74) *Attorney, Agent, or Firm* — Sughrue Mion, PLLC

(57) ABSTRACT

In a toroidal continuously variable transmission unit, a pair of guide surface portions 120, 120 are provided on a trunnion 15 so as to face oppositely each other and to extend in a direction which intersects a rotational center axis of a power roller 11 at right angles and intersects pivot shafts 14 at right angles. When a tangential force along a direction of the pivot shafts 14 is applied to the power roller 11, an outer circumferential surface 110 of an outer ring 28 can be brought into abutment with these guide surface portions 120, 120. By this, the toroidal continuously variable transmission unit with good machinability can be obtained in which the power roller together with the outer ring can be rolling guided smoothly relative to the trunnion by an inexpensive and simple construction while avoiding the offsetting of a shaft portion which supports the power roller.

9 Claims, 16 Drawing Sheets

FOREIGN PATENT DOCUMENTS

| | | |
|---|---|---|
| DE | 10 2005 048 074 A1 | 4/2007 |
| EP | 1 048 878 A1 | 11/2000 |
| JP | 07-198014 A | 8/1995 |
| JP | 08-200361 A | 8/1996 |
| JP | 2004-138249 A | 5/2004 |
| JP | 2004-324877 A | 11/2004 |
| JP | 2004-332807 A | 11/2004 |
| JP | 2006-038045 A | 2/2006 |

\* cited by examiner

TOROIDAL CONTINUOUSLY VARIABLE TRANSMISSION UNIT

BACKGROUND OF THE INVENTION

1. Technical Field

The present invention relates to a toroidal continuously variable transmission unit which can be used as a transmission unit for automotive vehicles or various types of industrial machines.

2. Background Art

A double cavity toroidal variously variable transmission unit for use in, for example, an automotive vehicle is configured as is shown in FIGS. 14 and 15. As is shown in FIG. 14, an input shaft (a rotational center axis) 1 is supported rotatably inside a casing 50, and two input-side discs 2, 2 and two output-side discs 3, 3 are attached to an outer circumference of the input shaft 1. In addition, an output gear 4 is supported rotatably on an outer circumference of an intermediate portion of the input shaft 1. The output-side discs 3, 3 are spline connected to tubular flange portions 4a, 4a which are provided at a central portion of the output gear 4.

The input shaft 1 is made to be driven to rotate by a drive shaft 22 via a loading cam type pressing device 12 which is provided between an input-side disc 2 shown as being situated on a left-hand side in the figure and a cam plate (a loading cam) 7. In addition, the output gear 4 is supported relative to a partition wall (an intermediate wall) 13 which is made up by connecting together two members via angular bearings 107 and is supported inside the casing 50 via the partition wall 13, whereby the output gear 4 can not only rotate about an axis O of the input shaft 1 but also is prevented from being displaced in the direction of the axis O.

The output-side discs 3, 3 are supported by needle bearings 5, 5 which are interposed between the input shaft 1 and themselves so as to rotate about the axis O of the input shaft. In addition, the left-hand input-side disc 2 in the figure is supported on the input shaft 1 via a ball spline 6, and a right-hand input-side disc 2 is spline connected to the input shaft 1, whereby these input-side discs 2 are made to rotate together with the input shaft 1. In addition, power rollers 11 (refer to FIG. 15) are held rotatably between internal surfaces (toroidal surfaces; also referred to as traction surfaces) 2a, 2a of the input disc 2, 2 and internal surfaces (toroidal surfaces; also referred to as traction surfaces) 3a, 3a of the output disc 3, 3.

A stepped portion 2b is provided on an inner circumferential surface 2c of the input-side disc 2 which is depicted as being situated on the right-hand side as viewed in FIG. 14, and a stepped portion 1b formed on an outer circumferential surface 1a of the input shaft 1 is brought into striking contact with the stepped portion 2b, while a back side (a right-hand side as viewed in FIG. 14) of the input-side disc 2 is brought into striking contact with a loading nut 9 screwed on a threaded portion formed on the outer circumferential surface of the input shaft. By this configuration, the displacement of the input-side disc 2 in the direction of the axis O relative to the input shaft 1 is prevented substantially. In addition, a coned disc spring 8 is provided between the cam plate 7 and a flange portion 1d of the input shaft 1, and this coned disc spring 8 imparts a pressure to abutment portions between the toroidal surfaces 2a, 2a, 3a, 3a of the respective discs 2, 2, 3, 3 and circumferential surfaces 11a, 11a of the power rollers 11, 11.

As is shown in FIG. 15, which is a sectional view taken along the line A-A in FIG. 14, a pair of yokes 23A, 23B are supported inside the casing 50 and in positions lying sideways of the output-side discs 3, 3 so as to hold both the discs 3, 3 from both sides thereof. The pair of yokes 23A, 23B are formed by pressing or forging a metal such as steel into a rectangular shape. In addition, to support rotatably pivot shafts 14 provided at both end portions of trunnions 15, which will be described later, circular support holes 18 are provided in four corners of the yokes 23A, 23B, and circular locking holes 19 are formed in central portions in a width direction of the yokes 23A, 23B.

The pair of the yokes 23A, 23B are supported by support posts 64, 68 formed at portions on inner surfaces of the casing 50 which oppositely face each other so as to oscillate about the support posts 64, 68 as fulcrums. These posts 64, 68 are provided, respectively, in a first cavity 221 and a second cavity 222 which exist between the internal surface 2a of the input-side disc 2 and the internal surface of the output-side disc 3 so as to face oppositely each other.

Consequently, the yokes 23A, 23B face oppositely at one end portions thereof an outer circumferential portion of the first cavity 221 and at the other end portions thereof an outer circumferential portion of the second cavity 222 in such a state that the yokes 23A, 23B are supported by the support posts 64, 68, respectively.

Since the first and second cavities 221, 222 have the same construction, hereinafter, only the first cavity 221 will be described.

As is shown in FIG. 15, in the inside of the casing 50, a pair of trunnions 15, 15 are provided in the first cavity 221 which each oscillate about a pair of pivot shafts (attitude shafts) 14, 14 which lie in positions which are twisted relative to the input shaft 1. In addition, in FIG. 15, the illustration of the input shaft 1 is omitted. The trunnions 15, 15 each have a pair of bent wall portions 20, 20 which are formed at both longitudinal (vertical in FIG. 15) end portions of a support plate portion 16 which constitutes a main body portion thereof so as to be bent towards an internal surface side of the support plate portion 16. In addition, a pocket portion P which is a recessed accommodation space for accommodating the power roller 11 is formed in each of the trunnions 15, 15 by these bent wall portions 20, 20. In addition, the pivot shafts 14, 14 are provided coaxially with each other on external surfaces of the respective bent wall portions 20, 20.

A circular hole 21 is formed in a central portion of the support plate portion 16, and a proximal end portion (a first shaft portion) 23a of a displacement shaft 23, which acts as a support shaft which supports the trunnion 15 rotatably, is supported in this circular hole 21. In addition, the inclination angles of the displacement shafts 23 which are supported at central portions of the trunnions 15, 15 are made to be adjusted by oscillating the trunnions 15, 15 about their associated pivot shafts 14, 14. Additionally, each power roller 11 is supported rotatably on a circumference of a distal end portion (a second shaft portion) 23b of the displacement shaft 23 which projects from an internal surface of each of the trunnions 15, 15, and the power rollers 11, 11 are held between each of the input-side discs 2, 2 and each of the output-side discs 3, 3. Note that the proximal end portion 23a and the distal end portion 23b of each of the displacement shafts 23, 23 are offset from each other.

In addition, as has been described before, the pivot shafts 14, 14 of each of the trunnions 15, 15 are supported so as to oscillate freely and to be displaced axially (vertically in FIG. 15) relative to the pair of yokes 23A, 23B, and the horizontal movement of the trunnions 15, 15 is restricted by the respective yokes 23A, 23B. As has been described before, the circular four support holes 18 are formed in the four corners of each of the yokes 23A, 23B, and the pivot shafts 14 which are provided at both the end portions of the trunnion 15 are supported in the support holes 18, respectively, via radial needle bearings (attitude bearings) 30 so as to freely oscillate (freely tilt). In addition, as has been described before, the circular locking holes 19 are formed in the central portion in the width direction (horizontal in FIG. 15) of the yokes 23A, 23B, and inner circumferential surfaces of the locking holes 19 are made into a shape of an inner surface of a circular tube so that the support posts 64, 68 are fitted therein, respectively. Namely, the upper yoke 23A is supported in an oscillating fashion by the spherical post 64 which is supported on the casing 50 via a fixing member 52, and the lower yoke 23B is supported in an oscillating fashion by the spherical post 68 and an upper cylinder body 61 of a drive cylinder 31 which supports the spherical post 68.

The displacement shafts 23, 23 provided on the trunnions 15, 15 are provided in 180-degree opposite positions relative to the input shaft 1. In addition, the direction in which the distal end portions 23b of the displacement shafts 23, 23 are offset relative to the proximal end portions 23a is made to be the same (vertically opposite in FIG. 15) as the rotational direction of both the discs 2, 2, 3, 3. In addition, the offset direction is made to be substantially at right angles to the direction in which the input shaft 1 is provided. Consequently, the respective power rollers 11, 11 are supported so as to be slightly displaced in a longitudinal direction of the input shaft 1. As a result of this, even in the event that the power rollers 11, 11 tend to be displaced in the axial direction of the input shaft 1 due to elastic deformation or the like of respective constituent members based on a thrust load generated by the pressing device 12, the displacement of the power rollers 11, 11 is absorbed with no unreasonable force applied to the respective constituent members.

In addition, a thrust ball bearing (a thrust bearing) 24, which is a thrust rolling bearing, and a thrust needle bearing 25 are provided between an external surface of the power roller 11 and an internal surface of the support plate portion 16 of the trunnion 15 sequentially in that order from the external surface of the power roller 11. Of these bearings, the thrust ball bearing 24 is such as to permit the rotation of each power roller 1 while bearing a load applied to the power roller 11 in a thrust direction. The thrust ball bearing 24 designed in that way is made up of a plurality of balls (rolling elements) 26, 26, an annular cage 27 for holding these balls 26, 26 in a rolling fashion, and an annular outer ring 28. In addition, an inner ring raceway of the thrust ball bearing 24 is formed on the external surface (a large end surface) of the power roller 11, while an outer ring raceway is formed on an internal surface of the outer ring 28.

In addition, the thrust needle bearing 25 is held between the internal surface of the support plate portion 16 of the trunnion 15 and an external surface of the outer ring 28. The thrust needle bearing 25 designed in this way permits the oscillation of the power roller 11 and the outer ring 28 about the proximal end portion 23a of the displacement shaft 23 while bearing a thrust load applied to the outer ring 28 from the power roller 11.

Furthermore, drive rods (shaft portions extending from the pivot shaft 14) 29, 29 are provided at one end portions (lower end portions in FIG. 15) of the respective trunnions 15, 15, and drive pistons (hydraulic pistons) 33, 33 are fixedly provided on outer circumferential surfaces of intermediate portions of the respective drive rods 29, 29. In addition, these drive pistons 33, 33 are fluid tightly fitted in the drive cylinder 31 which is made up of the upper cylinder body 61 and a lower Cylinder body 62. The drive pistons 33, 33 and the drive cylinder 31 make up a drive system 32 for displacing the respective trunnions 15, 15 in the axial direction of the pivot shafts 14, 14 of the trunnions 15, 15.

In the case of the toroidal continuously variable transmission which is configured as has been described above, the rotation of the drive shaft 22 is transmitted to the respective input-side discs 2, 2 and the input shaft 1 via the pressing device 12. Then, the rotation of the input-side discs 2, 2 is transmitted, respectively, to the output-side discs 3, 3 via the pair of power rollers 11, 11, and furthermore, the rotation of the output-side discs 3, 3 is taken out from the output gear 4.

When a rotational speed ratio between the input shaft 1 and the output gear 4 is changed, the pair of drive pistons 33, 33 are made to be displaced in opposite directions to each other. The pair of trunnions 15, 15 are displaced (offset) in opposite directions to each other in conjunction with the displacement of the respective pistons 33, 33. For example, the left-hand power roller 11 in FIG. 15 is displaced downwards, while the right-hand power roller 11 in the same figure is displaced upwards in the figure. As a result, directions of tangential forces are changed which act on the abutment portions between the circumferential surfaces 11a, 11a of the respective power rollers 11, 11 and internal surfaces 2a, 2a, 3a, 3a of the respective input-side discs 2, 2 and respective output-side discs 3, 3. Then, in conjunction with the changes in the tangential forces, the respective trunnions 15, 15 oscillate (tilt) about the pivot shafts 14, 14 which are rotatably supported on the yokes 23A, 23B in opposite directions to each other.

As a result of the oscillation of the trunnions 15, 15, abutment positions between the circumferential surfaces (truncation surfaces) 11a, 11a of the respective power rollers 11, 11 and the respective internal surfaces 2a, 3a change, whereby the rotational speed ratio between the input shaft 1 and the output gear 4 changes. In addition, when a torque transmitted between the input shaft 1 and the output gear 4 changes, resulting in a change in elastic deformation amount of the respective constituent members, the respective power rollers 11, 11 and the outer rings 28, 28 which are attached to the power rollers 11, 11 slightly rotate about the proximal end portions 23a, 23a of the respective displacement shafts 23, 23. Since the thrust needle bearings 25, 25 are present, respectively, between external surfaces of the respective outer rings 28, 28 and internal surfaces of the support plate portions 16 which constitute the trunnions 15, 15, the rotation is implemented smoothly. Consequently, only a small magnitude of force is necessary to change the inclination angles of the respective displacement shafts 23, 23.

Incidentally, in the toroidal continuously variable transmission unit which has the configuration described above, as has been described above, the distal end portion 23b and the proximal end portion 23a of the displacement shaft 23 which supports the power roller 11 are offset from each other so that the power roller 11 oscillates relative to the trunnion 15 so as to transmit smoothly the pressing force from the input-side disc 2 to the output-side disc 3. Namely, the rotational axis of the power roller 11 (the distal end portion 23b of the displacement shaft 23) is offset relative to the support shaft (the proximal end portion 23a of the displacement shaft 23) which supports rotatably the power roller 11 relative to the trunnion 15, that is, an axis of the inner hole 21. This will be true also in a construction where an outer ring 28 is integrated with a displacement shaft 23 as is shown in FIG. 16.

In a construction like this, however, the machining cost inevitably has to be increased to realize the offset configuration of the displacement shaft 23. In addition, the reduction in size and weight of the trunnion 15 is disrupted due to a restriction imposed by the offset configuration. Furthermore, since the bearing which bears the thrust load starts to perform a slipping motion due to the oscillating and rotating actions round the displacement shaft 23 of the power roller 11 and the like, there is caused a problem that oscillating resistance is increased.

To cope with this problem, conventionally, techniques have been proposed which avoid the offset in the shaft portion which rotatably supports the power roller 11 by the use of various devices. For example, in Patent Document No. 1, there is disclosed a construction in which an outer ring 28 is made to be guided slidingly relative to a trunnion 15 by supporting the outer ring 28 within a pocket portion P of the trunnion 15 so as to slide along an axial direction of an input shaft 1 by only a linear bearing which is interposed between the trunnion 15 and the outer ring 28.

In addition, in Japanese Patent Unexamined Publication No. JP-A-2004-138249 (JP '249)(FIG. 4), there is disclosed a construction flat surface portions are provided, respectively, on a supporting surface which faces a pocket portion P side of a support plate portion 16 of a trunnion 15 and an outer ring 28, and a roller bearing is interposed between these flat surface portions.

Furthermore, in the toroidal continuously variable transmission units described above, power transmission between the power rollers 11 and the input-side and the output-side discs 2, 3 is implemented in a non-contact fashion by virtue of a traction force applied via an oil film with a view to preventing damage to surfaces of those members. Because of this, a sufficient amount of lubrication oil (traction oil) as to form an oil film for transmission of torque in a non-contact fashion needs to be supplied a traction surface which is formed between the power roller 11 and the input-side and output-side discs 2, 3, and sufficient lubrication needs to be implemented on bearings which rotatably supports the discs 2, 3 and the power rollers 11 (hereinafter, also referred to as power roller bearings). Then, for example, in Japanese Patent Unexamined Publication No. JP-A-2004-324877 (JP '877)(Fig. 10), by mounting a mesh filter for a displacement shaft 23 on a power roller bearing so as to remove contaminants (foreign matters) immediately before a thrust ball bearing 24 which is subjected to a severe service condition, a good lubrication of the bearing is attempted to be implemented.

The problems with these arrangements are as follows.

In the construction disclosed in Japanese Patent Unexamined Publication No. JP-A-7-198014 (JP '014), however, since the outer ring 28 is slidingly guided relative to the trunnion 15 by only the linear bearing interposed between the trunnion 15 and the outer ring 28, friction resistance is increased, and there may be caused a fear that the pressing force is not smoothly transmitted from the input-side disc 2 to the output-side disc 3. Because of this, there may also be caused a possibility that the pressing force becomes insufficient on the output-side disc 3 side.

On the other hand, in the construction disclosed in JP '249, since the flat surface portion which has to be machined with good accuracy is provided on both the trunnion 15 and the outer ring 28, there is caused a problem that the machining cost is increased. In addition, since a circulation mechanism of the roller bearing is difficult to be formed, it becomes difficult to realize a perfect rolling guide.

Furthermore, in the construction disclosed in JP '877, since the filter is mounted on the displacement shaft 23, it becomes difficult to secure a sufficiently large space as to mount the filer from the viewpoints of strength and rigidity, and hence, only a small filter can be mounted. Because of this, there is caused a fear that the filter is clogged early.

On the other hand, in the construction disclosed in JP '249, since the flat surface portion which has to be machined with good accuracy is provided on both the trunnion 15 and the outer ring 28, there is caused a problem that the machining cost is increased. In addition, since a circulation mechanism of the roller bearing is difficult to be formed, it becomes difficult to realize a perfect rolling guide.

SUMMARY OF THE INVENTION

The invention has been made in view of the situations described above, and an object thereof is to provide a toroidal continuously variable transmission unit with good machinability which can rollingly guide an outer ring and a power roller relative to a trunnion in a smooth fashion by an inexpensive and simple construction while avoiding offset in a shaft portion which rotatably supports the power roller.

Means for Solving the Problem

With a view to attaining the object, according to a first aspect of the invention, there is provided a toroidal continuously variable transmission unit including:

an input-side disc and an output-side disc which are supported coaxially with each other and rotatably so that internal surfaces thereof are made to face each other;

power rollers held between the input-side disc and the output-side disc;

trunnions which is arranged in a twisted position relative to rotational center axes of the input-side disc and the output-side disc, each oscillate about a pair of pivot shafts which are provided coaxially with each other, and support rotatably the respective power rollers; and thrust bearings each including:
an inner ring made up of the power roller;
an outer ring; and
rolling elements which roll between the inner ring and the outer ring,
wherein the thrust bearings support a load applied to the power roller in a thrust direction,
wherein a pair of guide surface portions are provided on the trunnion which face oppositely each other and extend in a direction which intersects the Notational center axis of the power roller at right angles and intersects the pivot shafts at right angles, so that an outer circumferential surface of the outer ring is adapted to be brought into abutment with the guide surface portion when a tangential force is applied to the power roller in a direction which follows along the pivot shafts.

According to the first aspect of the invention, the pair of guide surface portions are provided on the trunnion which face oppositely each other and extend in the direction which intersects the rotational center axis of the power roller at right angles and intersects the pivot shafts at right angles, so that the outer circumferential surface of the outer ring is brought into abutment with one of the guide surface portions, allowing the outer ring to roll on the guide surface portion when the tangential force is applied to the power roller in the direction which follows along the pivot shafts, whereby the outer ring (and hence, the power roller) slides in a direction which intersects the rotational center axis of the power roller at right angles and intersects the pivot shafts at right angles. Thus, the power roller together with the outer ring can be rollingly guided relative to the trunnion in a smooth fashion, and consequently, the pressing force can smoothly be transmitted from the input-side disc to the output-side disc. In addition, since the function and advantage described above can be realized only by providing the pair of guide surface portions on the trunnion, the construction is made simple, and since a number of machining steps requiring high accuracy does not have to be involved (the shaft portion which supports the power roller does not have to be offset), machinability becomes good and machining becomes inexpensive.

In addition, the hardness on the guide surface portions is preferably increased in order to suppress the wear of the guide surface portions. Furthermore, the surface roughness of the guide surface portions is preferably increased through grinding. In addition, in order to reduce friction force to suppress the wear of the guide surface portions, a friction coefficient reduction treatment is preferably applied to at least either of the guide surface portions and an outer circumferential surface of the outer ring. Because of this, a film of polytetrafluoroethylene (PTFE) or molybdenum disulfide ($MoS_2$) is preferably formed on at least either of the guide surface portions and the outer circumferential surface of the outer ring.

In addition, according to a second aspect of the invention, there is provided the toroidal continuously variable transmission unit as set forth in the first aspect of the invention, wherein the guide surface portions are formed integrally on the trunnion.

According to the second aspect of the invention, since the guide surface portions are formed integrally on the trunnion, the construction can be simplified.

In addition, according to a third aspect of the invention, there is provided the toroidal continuously variable transmission unit as set forth in the first aspect of the invention, wherein the guide surface portions are formed on guide members provided on the trunnion.

According to the third aspect of the invention, since the guide surface portions are formed on guide members provided on the trunnion, in the event that the guide surface portions get worn and hence become necessary to be replaced, there is provided an advantage that only the guide members have to be replaced.

In addition, according to a fourth aspect of the invention, there is provided the toroidal continuously variable transmission unit as set forth in the third aspect of the invention, wherein the guide members are formed integrally with a thrust bearing member which is provided between the outer ring and the trunnion.

Here, although there is imposed no specific limitation on the thrust bearing, a so-called needle bearing in which needle rollers are disposed radially or a thin plate-shaped sliding bearing is preferably adopted.

According to the fourth aspect of the invention, since the guide members are formed integrally with the thrust bearing member which is provided between the outer ring and the trunnion, the number of parts can be reduced, thereby making it possible to reduce the manufacturing costs.

According to a fifth aspect of the invention, there is provided the toroidal continuously variable transmission unit as set forth in the first aspect of the invention, wherein a crowning is provided on at least either of the guide surface portions and the outer circumferential surface of the outer ring.

According to the fifth aspect of the invention, since the crowning is provided on at least either of the guide surface portions and the outer circumferential surface of the outer ring, even in the event that the trunnion is deformed by the pressing force by the input-side and output-side discs and the power roller, since a good contact state of the outer ring with the guide surface portions can be maintained, an increase in wear or friction due to edge load can be prevented.

According to a sixth aspect of the invention, there is provided the toroidal continuously variable transmission unit as set forth in the first aspect of the invention, wherein the trunnion includes:

a support plate portion;

a pair of bent wall portions which are formed at both end portions along a direction of the pivot shafts of the support plate portion so as to be bent towards an internal surface side of the support plate portion; and a connecting portion which connects distal end portions of the pair of bent wall portions to each other, and the power roller is disposed among the support plate portion, the pair of bent wall portions and the connecting portion.

Since a large force resulting from the pressing force applied to the power roller is loaded on the trunnion which supports the power roller, the trunnion is deformed by the force, and the contact positions between the power roller and the discs change, reducing the power transmission efficiency. To prevent the reduction in the power transmission efficiency, the rigidity of the trunnion is preferably increased. According to the sixth aspect of the invention, since the distal end portions of the pair of bent wall portions of the trunnion are configured so as to be connected to each other by the connecting portion, the rigidity of the trunnion can be increased. In addition, even in the event that the connecting portion is formed integrally with the pair of bent wall portions of the trunnion, the power roller portion can be inserted from a side of the trunnion to be disposed between the support plate portion, the pair of bent wall portions and the connecting portion. Consequently, since the connecting portion can be formed integrally with the trunnion to thereby omit an attaching means for attaching the connecting portion to the trunnion, the rigidity of the trunnion can be increased at low costs.

In addition, according to a seventh aspect of the invention, there is provided the toroidal continuously variable transmission unit as set forth in the first aspect of the invention, the trunnion includes:

a support plate portion; and a pair of bent wall portions which are formed at both end portions along a direction of the pivot shafts of the support plate portion so as to be bent towards an internal surface side of the support plate portion, an accommodation space for accommodating the outer ring and the power roller is formed by an internal surface of the support plate portion and the pair of bent wall portions, and in the accommodation space, a dimension along the direction of the pivot shafts of an outer ring accommodation space for accommodating the outer ring is set smaller than a dimension along the pivot shafts of a power roller accommodation space for accommodating the power roller.

According to the seventh aspect of the invention, since the dimension along the direction of the pivot shafts of an outer ring accommodation space for accommodating the outer ring is set smaller than the dimension along the pivot shafts of a power roller accommodation space for accommodating the power roller, an outside diameter of the outer ring can be made smaller than an outside diameter of the power roller, and therefore, the outer circumferential portion of the outer ring can be prevented from being brought into contact with the traction surfaces (internal surfaces) of the input and output discs.

In addition, according to an eighth aspect of the invention, there is provided the toroidal continuously variable transmission unit as set forth in the first aspect of the invention, the outer ring includes:

an outer ring main body portion which makes up an outer ring portion of the thrust bearing and a shaft portion which extends substantially vertically from the outer ring main body portion for supporting the power roller rotatably, a recessed portion, which forms part of an oil path for supplying lubricating oil to the thrust bearing, is provided in the outer ring, a filter is mounted in an interior of the recessed portion for removing foreign matters in the lubricating oil.

According to the eighth aspect of the invention, when a tangential force is applied to the power roller, the outer circumferential surface of the outer ring and the guide surface portion of the trunnion are configured so as to be brought into abutment with each other, so that the power roller is allowed to roll on the guide surface portion, whereby the pressing force is made to be transmitted from the input-side disc to the output-side disc. In addition, since the shaft portion of the outer ring constitutes a portion which does not contribute to strength, rigidity and function, by providing the recessed portion on the outer ring, in particular, providing the recessed portion on the shaft portion, the recessed portion can be secured to a large extent without causing any problem with strength, rigidity and function. Consequently, a filter which is large in size can be mounted in the recessed portion. As a result, not only can the occurrence of clogging in the filter be reduced but also the weight of the outer ring can be reduced by the amount by which the recessed portion is provided, thereby making it possible to reduce the weight of the whole trunnion and power roller system.

In addition, according to a ninth aspect of the invention, there is provided the toroidal continuously variable transmission unit as set forth in the eighth aspect of the invention, wherein the recessed portion extends in an axial direction from the outer ring main body portion as far as the shaft portion.

According to the ninth aspect of the invention, since the recessed portion extends in the axial direction from the outer ring main body portion as far as the shaft portion, an internal volume of the recessed portion can be secured largely to a maximum extent, whereby not only can the occurrence of clogging in the filter be reduced further but also the reduction in weight of the whole trunnion and power roller system can be promoted.

According to the toroidal continuously variable transmission unit of the invention, the pair of the guide surface portions are provided on the trunnion which extend in the direction which intersects the rotational center axis of the power roller at right angles and intersects the direction of the pivot shafts at right angles, and when a tangential force is applied to the power roller along the direction of the pivot shafts, the outer circumferential surface of the outer ring is brought into abutment with one of the guide surface portions so that the outer ring is allowed to roll on the guide surface portion. As a result of tolling, since the outer ring slides in the direction which intersects the rotational center axis of the power roller at right angles and intersects the direction of the pivot shafts at right angles, not only the outer ring but also the power roller can be rolling guided smoothly relative to the trunnion while avoiding the offsetting of the shaft portion which supports the power roller by the inexpensive and simple construction.

Figure 1:
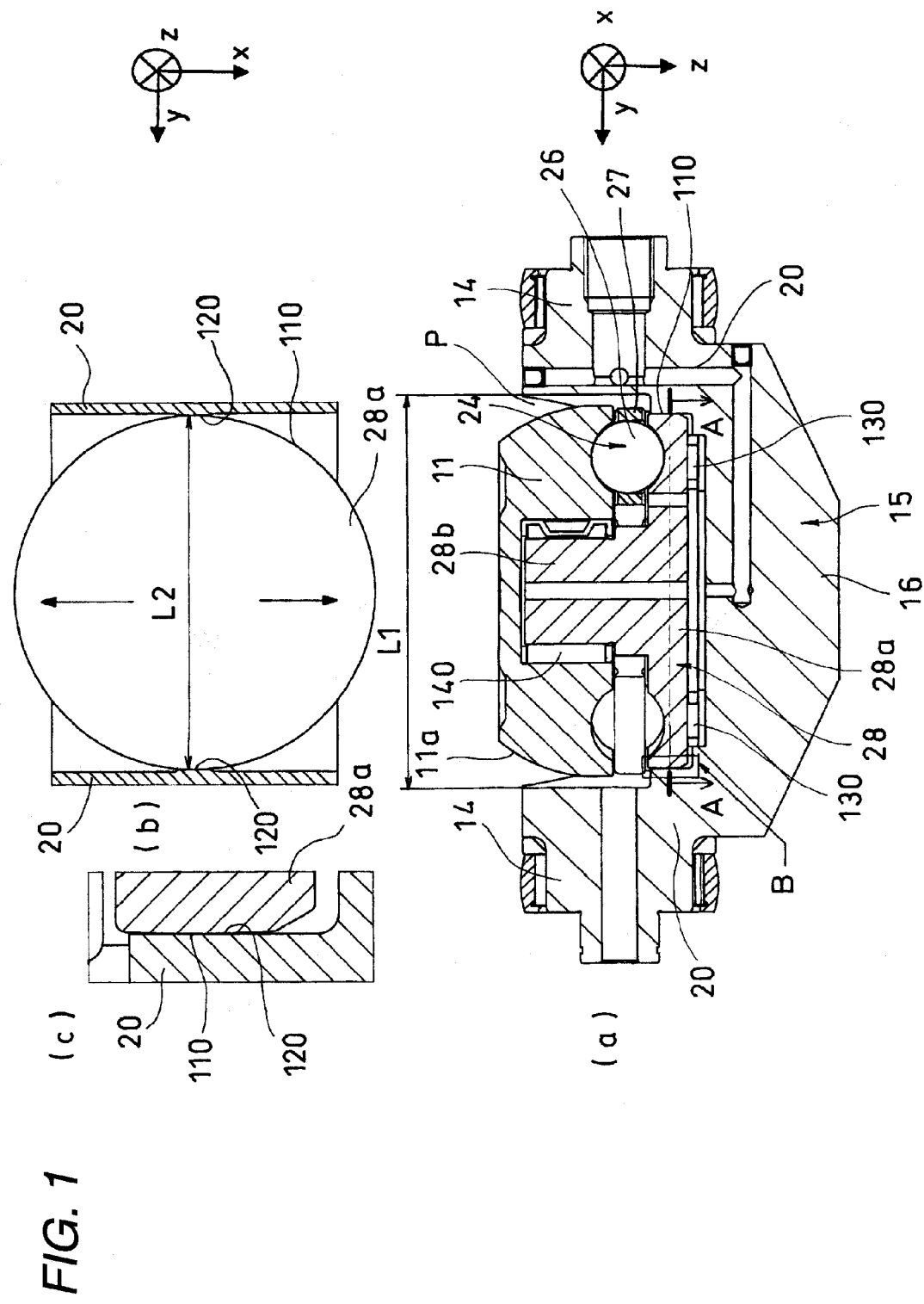
FIG. 1 shows drawings depicting a toroidal continuously variable transmission unit according to a first embodiment of the invention, of which (a) is a sectional view of a main part, (b) is a sectional view taken along the line A-A in (a), and (c) is an enlarged view of a portion B in (a).

DESCRIPTION OF REFERENCE NUMERALS AND CHARACTERS 2 input-side disc;
3 output-side disc;
11 power roller (inner ring);
14 pivot shaft;
15 trunnion;
24 thrust ball bearing (thrust bearing);
26 ball (rolling element);
28 outer ring;
28a outer ring main body portion;
28b shaft portion;
111 outer circumferential surface;
120 guide surface portion;
130 thrust rolling bearing (thrust bearing);
150 guide member;
175 connecting member;
202 oil path;
210 filter;
S recessed space (recessed portion);
P pocket portion (accommodation space).

DETAILED DESCRIPTION OF THE INVENTION

Figure 14:
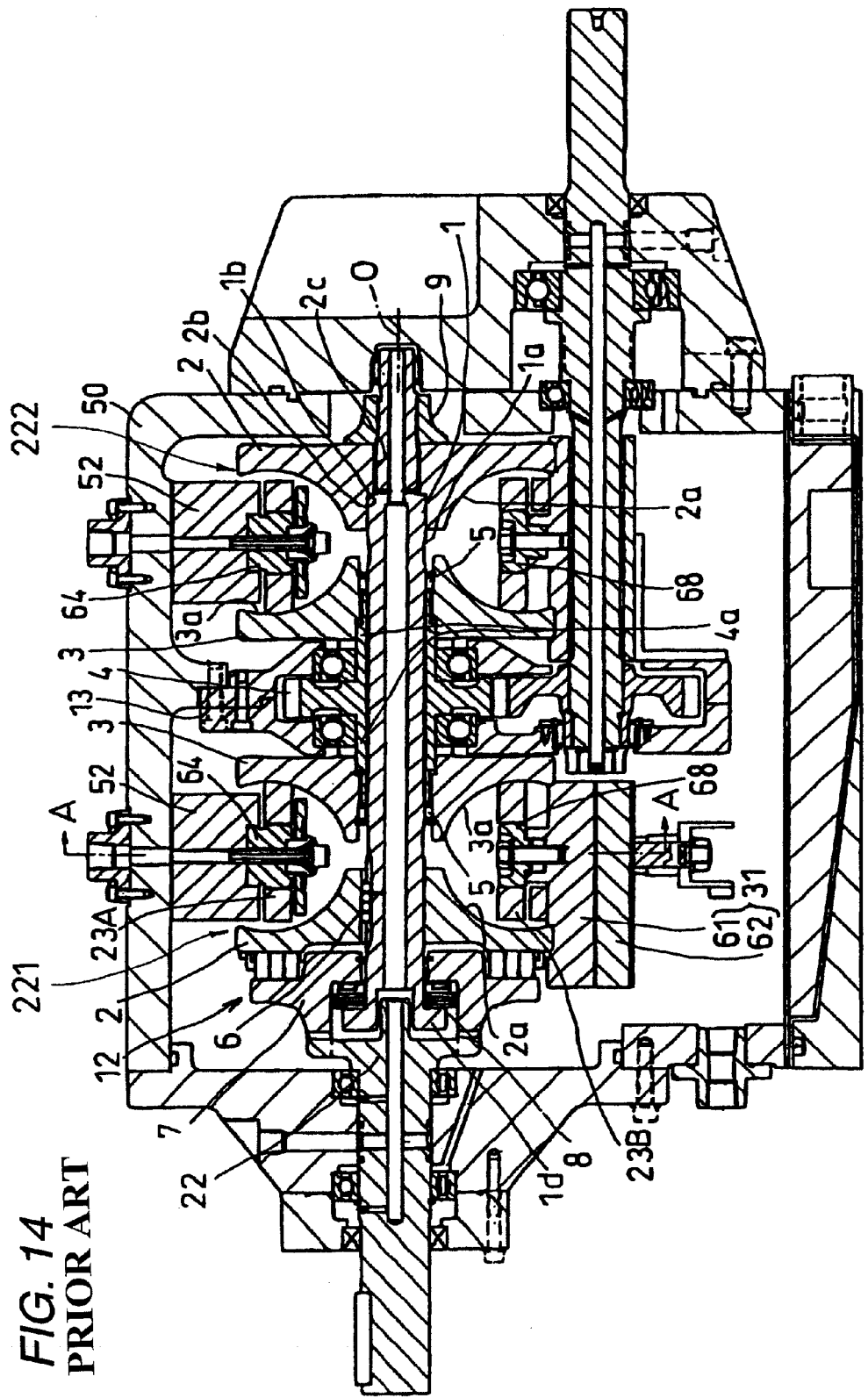
FIG. 14 is a sectional view depicting an example of a specific construction of a known toroidal continuously variable transmission unit.
Figure 15:
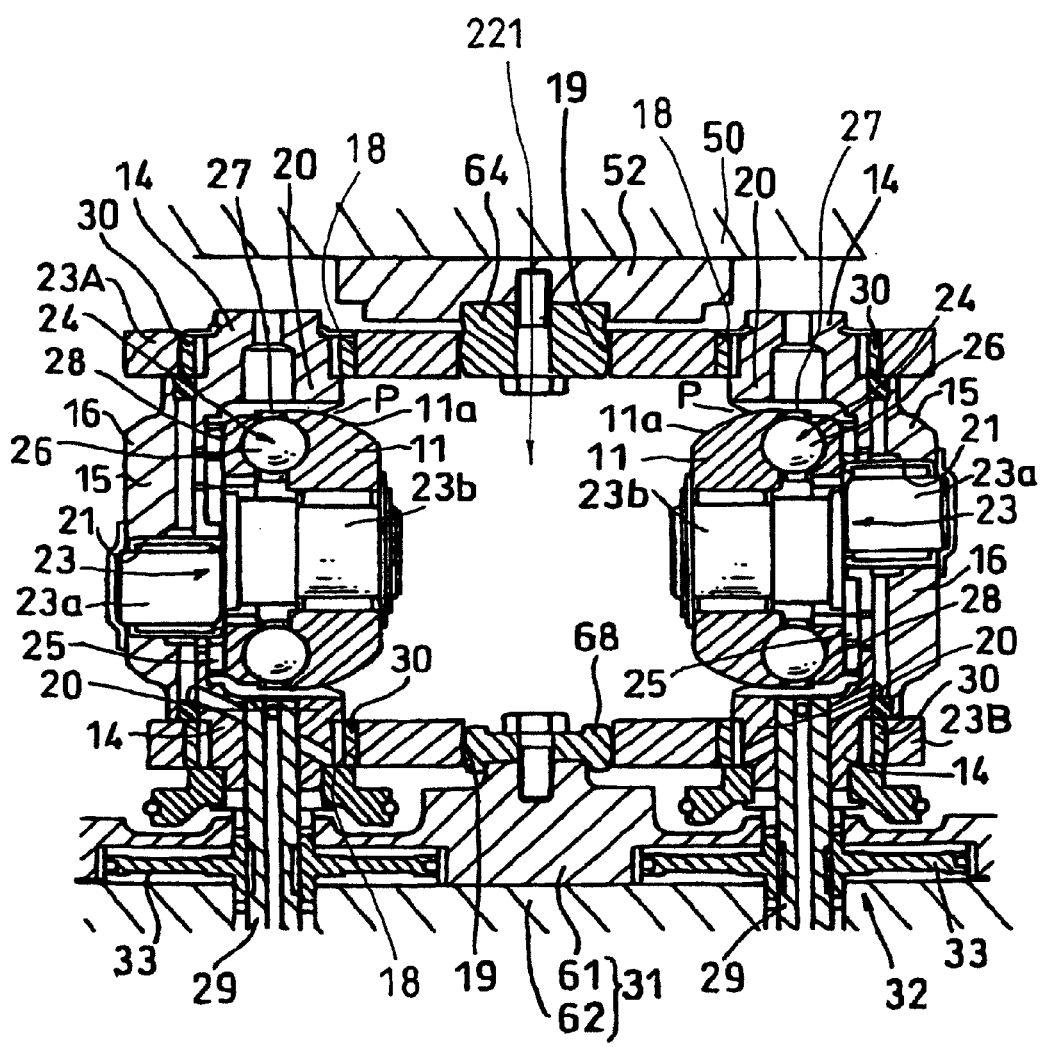
FIG. 15 is a sectional view taken along the line A-A in FIG. 14.
Figure 16:
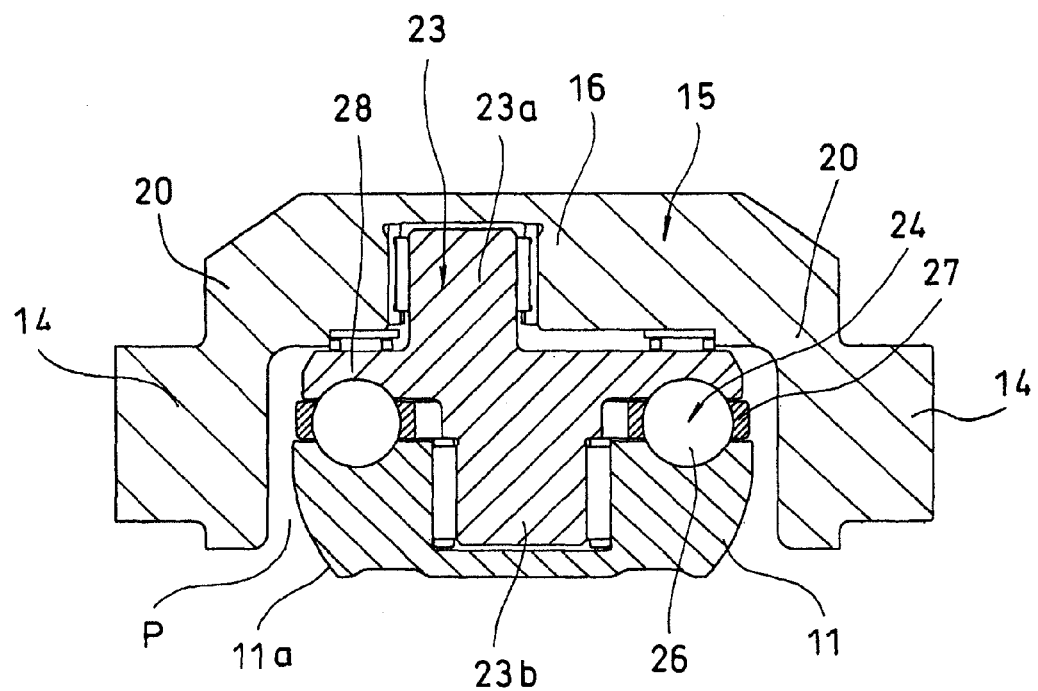
FIG. 16 is a sectional view of a main part of a known toroidal continuously variable transmission unit in which an outer ring and a displacement shaft are integrated.

Hereinafter, referring to the drawings, embodiments of the invention will be described. Note that the invention is characterized by a supporting construction of a power roller relative to a trunnion, and since the other configurations and functions thereof are the same as the known configurations and functions that have been described before, in the following description, only characteristic portions of the invention will be described, and like reference numerals to those imparted in FIGS. 14 to 16 will be imparted to other portions than those characteristic portions of the invention so as to limit the description thereof to a level of brief description.

Figure 2:
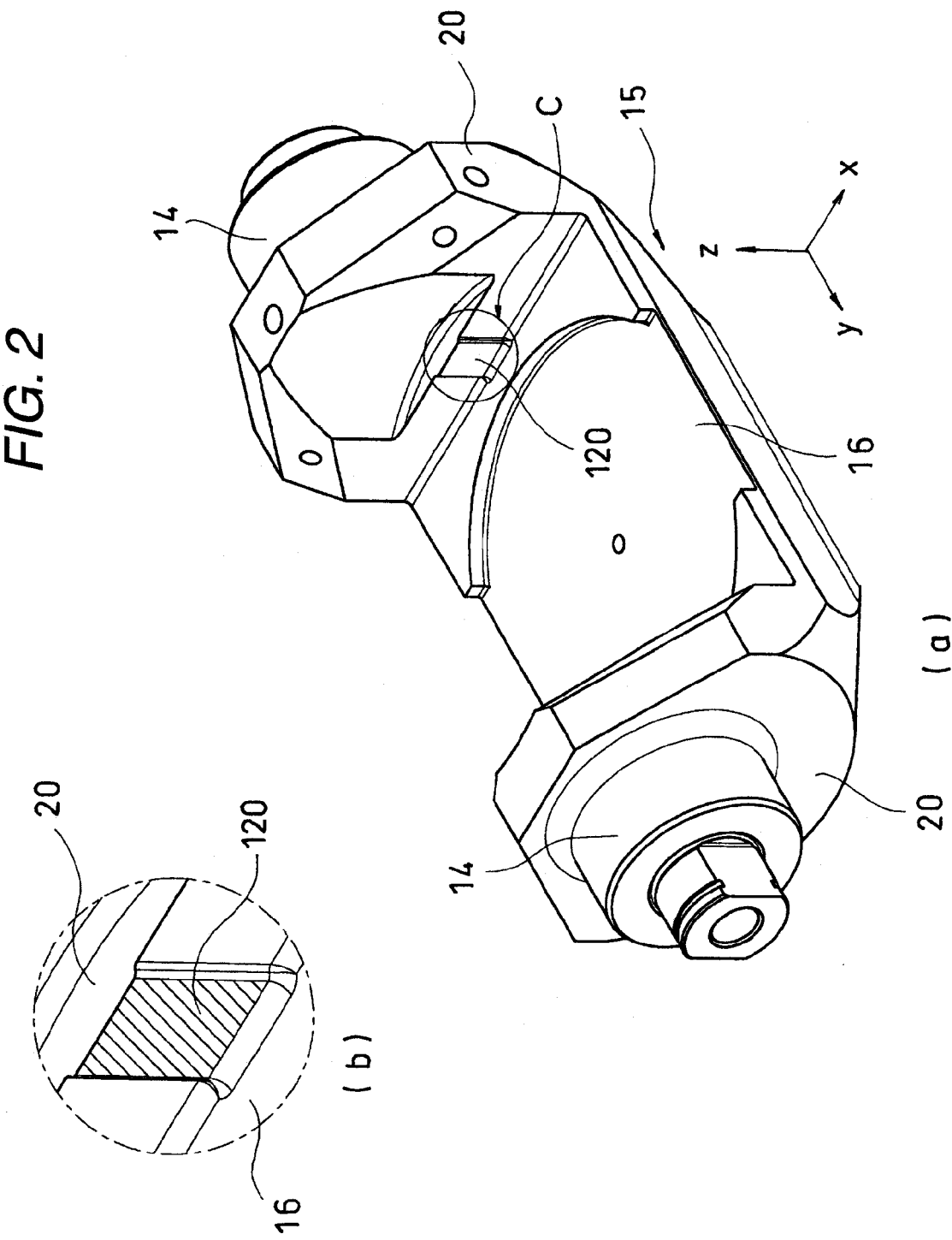
FIG. 2(a) is a perspective view of a trunnion.
FIG. 2(b) is an enlarged view of a portion C.

FIGS. 1 and 2 show a first embodiment of the invention. As is shown in the figures, in this embodiment, a construction is adopted in which a power roller 11 can be oscillating and rolling guided smoothly relative to a trunnion 15 while avoiding the offsetting of a shaft portion which supports the power roller 11. More specifically, an outer ring 28 is made up of a substantially disc-shaped outer ring main body portion 28*a* which makes up an outer ring of a thrust ball bearing 24 and a shaft portion 28*b* which extends vertically from a center of an internal surface of the outer ring main body portion 28*a* so as to support rotatably the power roller 11 (is made up of a construction in which, as it were, the outer ring 28 and the displacement shaft 23 of the aforesaid known construction are made integral). The outer ring main body portion 28*a* has an outer circumferential surface 110 which is concentric with a rotational center axis of the power roller 11, that is, a rotational center axis of the shaft portion 28*b*. A crowning is provided on the outer circumferential surface 110 of the outer ring portion 28*a*.

The outer ring 28 is accommodated within a recessed pocket portion P inside the trunnion 15, and a pair of guide surface portions 120, 120 are formed on the trunnion 15 in positions which oppositely face the outer circumferential surface 110 of the outer ring main body portion 28*a* so as to oppositely face each other and to extend in a twisted direction which intersects the rotational center axis of the power roller 11. To describe in greater detail, the pair of guide surface portions 120, 120 extend in the direction which intersects the rotational center axis (rotational axis) of the power roller 11 at right angles and intersects the pivot shafts 14 at right angles. Each guide surface portion 120 is formed by a distal end face (a front surface) made up of a substantially quadrangular plane of a projecting portion which projects inwardly in a quadrangular plate-like shape from an internal surface of a bent wall portion 20 of the trunnion 15. Each guide surface portion 120 is formed on the bent wall portion 20 of the trunnion 15 at a substantially central portion along rotational center axes of discs 2, 3. The hardness of each guide surface portion 120 is increased through induction hardening or the like, and the surface roughness of the guide surface portion 120 is increased through grinding. A distance between these guide surface portions 120, 120 is set slightly larger than an outside diametrical dimension of the outer ring main body portion 28*a*.

In addition, a friction coefficient reduction treatment is applied to at least either of the guide surface portions 120, 120 and the outer circumferential surface 110 of the outer ring main body portion 28*a* of the outer ring 28. As the friction coefficient reduction treatment, a film of polytetrafluoroethylene (PTFE) or molybdenum disulfide ($MoS_2$) is formed on at least either of the guide surface portions 120, 120 and the outer circumferential surface 110 of the outer ring main body portion 28*a* of the outer ring 28.

In addition, the recessed pocket portion P which is formed by an internal surface of support plate portion 16 and a pair of bent wall portions 20, 20 of the trunnion 15 constitutes an accommodation space for accommodating the outer ring 28 and the power roller 11. In the accommodation space, a dimension L1 along a direction of pivot shafts of an outer ring accommodation space for accommodating the outer ring 28 is set smaller than a dimension L2 along the direction of the pivot shafts of a power roller accommodation space for accommodating the power roller 11.

In addition, a thrust rolling bearing 130 for bearing a load applied to the power roller 11 in a thrust direction (a direction directed from a small end face side to a large end face side of the power roller 11) is interposed between the trunnion 15 and the outer ring main body portion 28*a*.

Additionally, a radial rolling bearing 140 is interposed between the shaft portion 28*b* and the power roller 11.

Consequently, in the configuration that has been described above, when a tangential force is applied to the power roller 11 in a radial direction (a direction along the pivot shafts 14 of the trunnion 15; a y direction in the figure), the power roller 11 is displaced towards one of the pivot shafts 14, 14 (the y direction in the figure), and in conjunction with the displacement, the outer circumferential surface 110 of the outer ring main body portion 28*a* is pressed against one of the guide surface portions 120, 120 of the trunnion 15. Then, the outer ring main body portion 28*a* is allowed to roll on the guide surface portion 120. Namely, the outer ring main body portion 28*a*, that is, the power roller 11 can shift relative to the trunnion 15 in a direction which intersects the rotational center axis of the power roller 11 at right angles and intersects the pivot shafts 14 at right angles (in a drawing showing a state before the trunnion 15 is tilted, an x direction in the drawing following a rotational center axis of the discs 2, 3).

As has been described heretofore, in this embodiment, the pair of guide surface portions 120, 120 are provided on the trunnion 15 so as to face oppositely each other and to extend in the direction which intersects the rotational center axis of the power roller 11 at right angles and intersects the pivot shafts 14 at right angles. When the tangential force is applied to the power roller 11 in the radial direction, the outer circumferential surface 110 of the outer ring main body portion 28*a* of the outer ring 28 is brought into abutment with one of the guide surface portions 120, 120, and the outer ring main body portion 28*a* rolls on the guide surface portion 120, whereby since the outer ring 28 and hence the power roller 11 slide in the direction which intersects the rotational center axis of the power roller 11 and intersects the pivot shafts 14 at right angles, the power roller 11 together with the outer ring 28 can be rolling guided smoothly with a small frictional resistance relative to the trunnion 15 while avoiding the offsetting of the shaft portion which supports the power roller 11. Consequently, a pressing force can smoothly be transmitted from the input-side disc 2 to the output-side disc 3. In addition, since the function and advantage that have been described above can be realized only by providing the pair of guide surface portions 120, 120 on the trunnion 15, the construction is made simple, and a number of machining steps requiring high accuracy does not have to be involved (the shaft portion which supports the power roller does not have to be offset), machinability becomes good and machining becomes inexpensive.

In addition, in this embodiment, since the guide surface portions 120, 120 are formed integrally on the trunnion 15, the construction can be simplified.

Furthermore, since the crowning is provided on the outer circumferential surface 110 of the outer ring main body portion 28a of the outer ring 28, even in the event that the trunnion 15 is deformed by the pressing force by the input-side and output-side discs 2, 3 and the power roller 11, since the good contacting state can be maintained between the outer circumferential surface 110 of the outer ring main body portion 28a and the guide surface portion 120, an increase in wear or friction by edge load can be prevented.

In addition, in this embodiment, since the hardness of the guide surface portions 120, 120 is increased through induction hardening or the like, the wear of the guide surface portions 120, 120 can be suppressed.

Furthermore, since the surface roughness of the guide surface portions 120, 120 is increased through grinding and the film is formed for reduction in friction coefficient, the friction force can be reduced to thereby suppress wear.

Additionally, in the embodiment, since the thrust rolling bearing 130 for bearing the load applied to the power roller 11 in the thrust direction is interposed between the trunnion 15 and the outer ring 28, the rolling guiding performance of the power roller 11 relative to the trunnion 15 can be increased further.

In addition, in this embodiment, of the pocket portion P (the accommodation space), since the dimension L1 along the direction of the pivot shafts of the outer ring accommodation space for accommodating the outer ring 28 is set smaller than the dimension L2 along the direction of the pivot shafts of the power roller accommodation space for accommodating the power roller 11, the outside diameter of the outer ring 28 is made smaller than the outside diameter of the power roller 11, and therefore, when the power roller 11 is tilted, an outer circumferential portion of the outer ring 28 can be prevented from being brought into contact with the traction surfaces (the internal surfaces) of the input and output discs.

Figure 3:
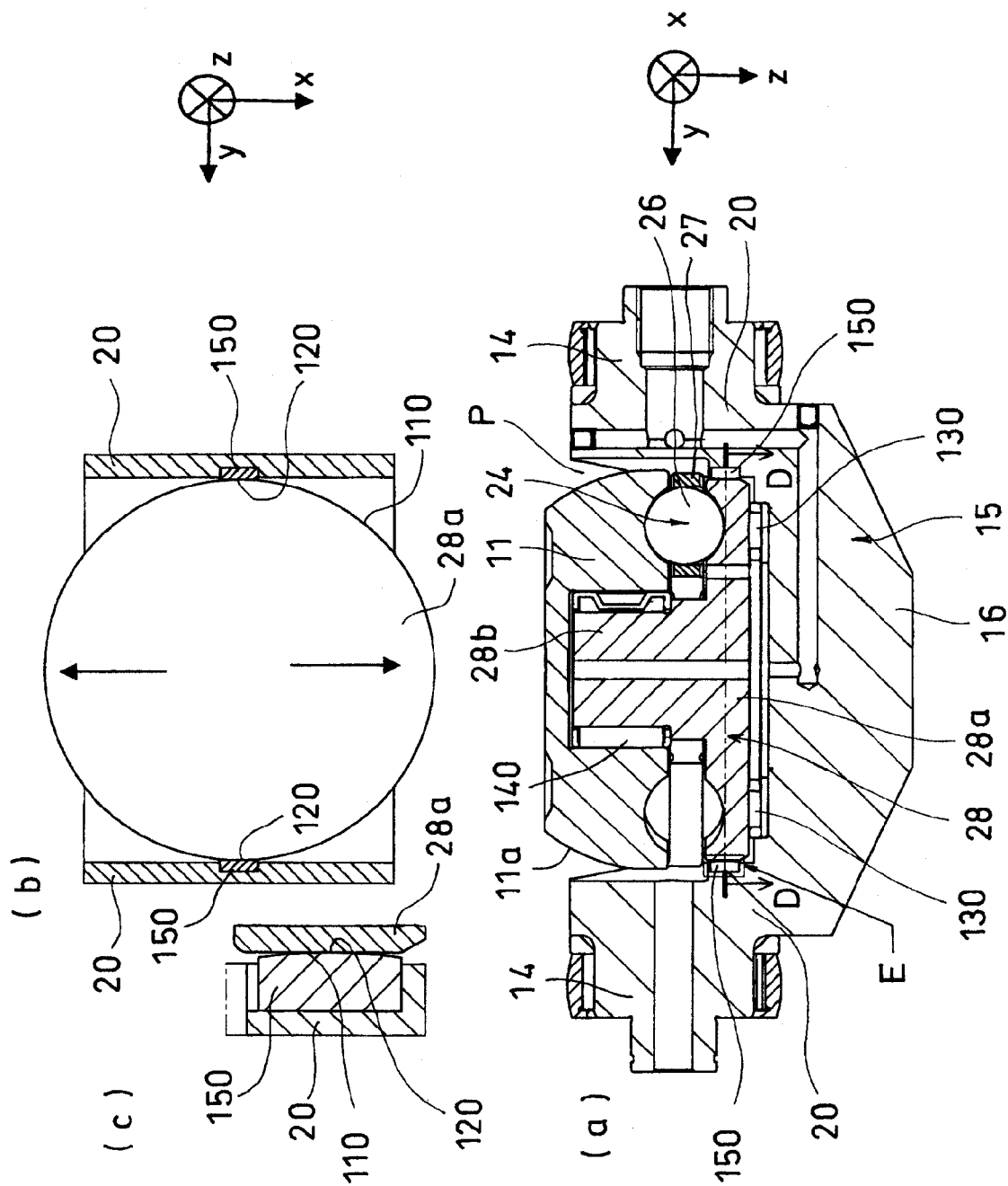
FIG. 3 shows drawings depicting a toroidal continuously variable transmission unit according to a second embodiment of the invention, of which (a) is a sectional view of a main part, (b) is a sectional view taken along the line D-D in (a), and (c) is an enlarged view of a portion E in (a).

FIG. 3 shows a second embodiment. In this embodiment, a pair of guide surface portions 120, 120 are not formed integrally on a trunnion 15 but are made up of front surfaces which are made up of quadrangular planes of a pair of quadrangular plate-shaped guide members 150, 150 provided on the trunnion 15. In addition, although no crowning is provided on an outer circumferential surface 110 of an outer ring main body portion 28a, a crowning is provided on the guide surface portion 120 of each guide member 150. Since the other configurations including the configuration of the pair of guide surface portions 120, 120 are the same as those of the first embodiment, like reference numerals will be imparted to like constituent elements, and the description thereof will be omitted.

Figure 4:
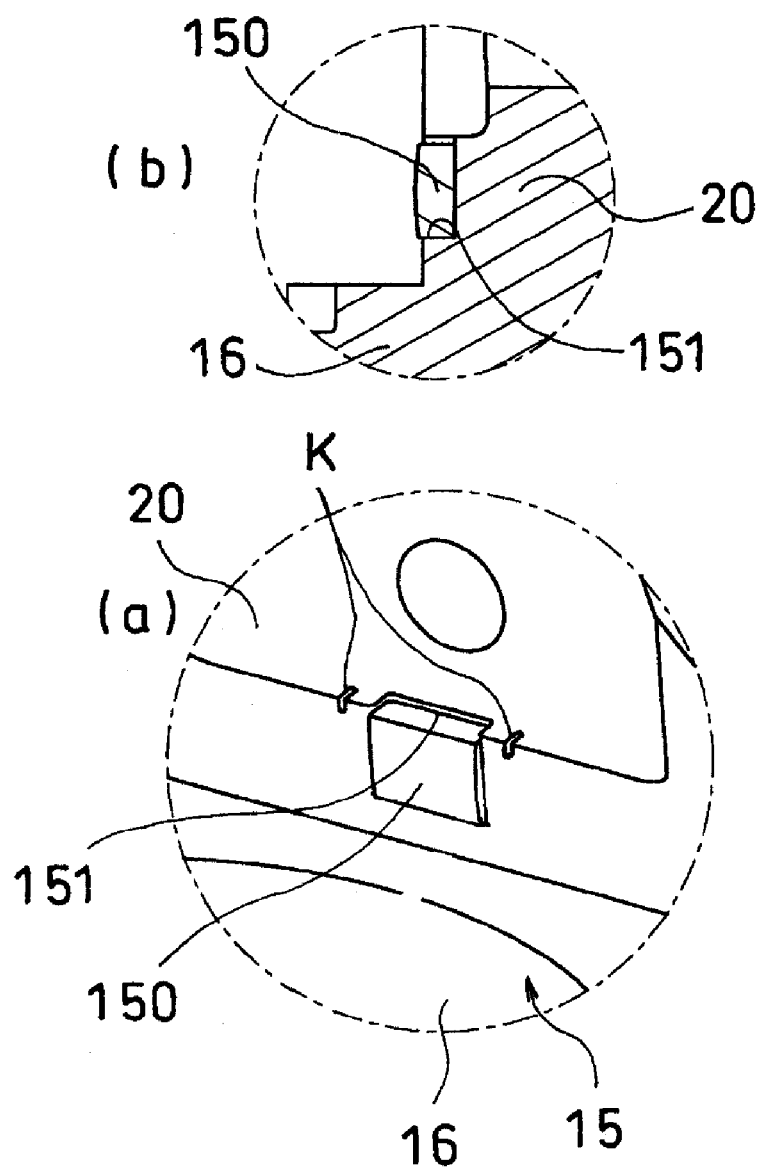
FIG. 4 shows drawings depicting an attaching method of a guide member to the trunnion, of which (a) is a perspective view of a main part of the trunnion, and (b) is a vertical sectional view of the main part of the trunnion.

The guide member 150 may be attached to the trunnion 15 in such a manner as not to move relative to the trunnion 15 while a toroidal continuously variable transmission unit is in operation. As an attaching method of the guide member 150 to the trunnion 15 in the way described above, for example, as is shown in FIG. 4, there is a method using clamps K, K. Namely, a substantially quadrangular plate-shaped recessed portion 151 which is made to open inwards and to an opposite side to a support plate portion 16 is provided on an internal surface of a bent wall portion 20 of the trunnion 15, and the substantially quadrangular plate-shaped guide member 150 is inserted into the recessed portion so as to slightly project from the internal surface of the bent wall portion 20, and positions in the vicinity of both sides of the opening opposite to the support plate portion 16 are clamped.

Figure 5:
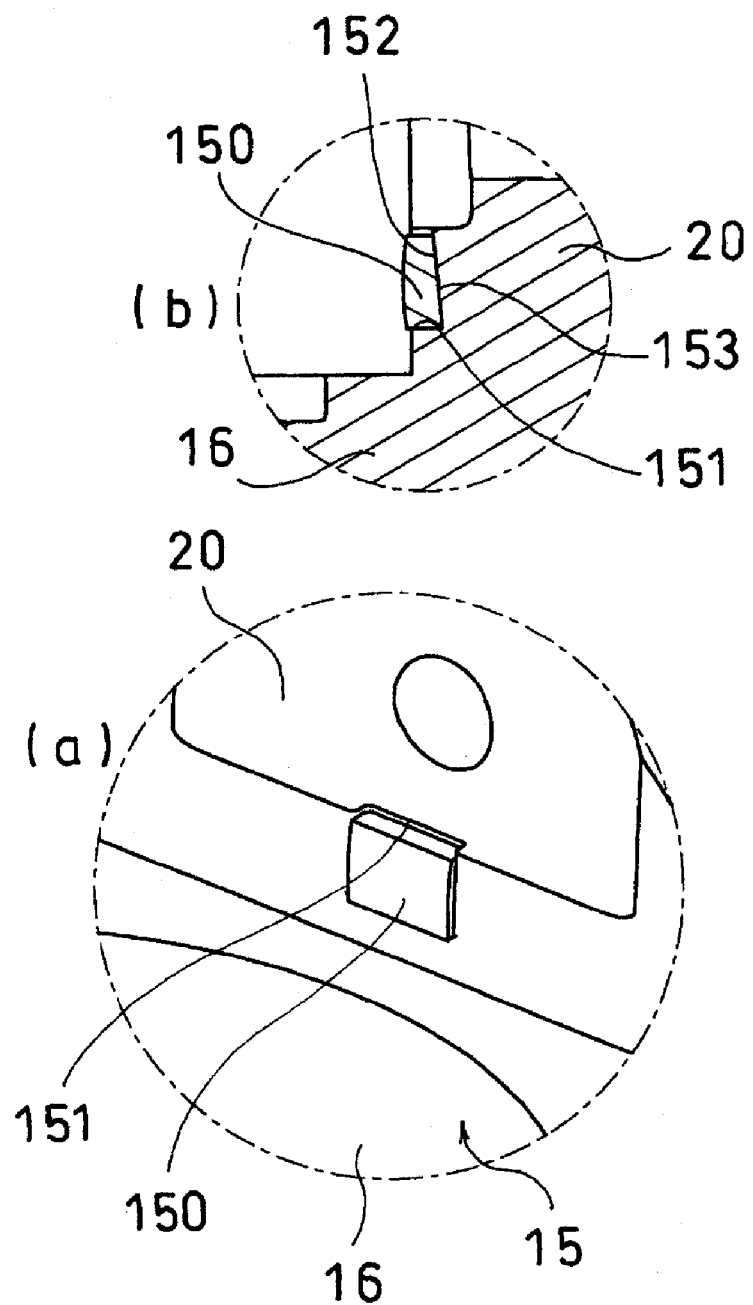
FIG. 5 shows drawings depicting another attaching method of a guide member to the trunnion, of which (a) is a perspective view of a main part of the trunnion, and (b) is a vertical sectional view of the main part of the trunnion.

In addition, as is shown in FIG. 5, a bottom surface 152 of the recessed portion 151 is formed into a tapered surface, and a rear surface 153 of the guide member 150 is formed into a tapered surface which is associated with the tapered surface of the recessed portion 151, the guide member 150 being inserted into the recessed portion 151.

Figure 6:
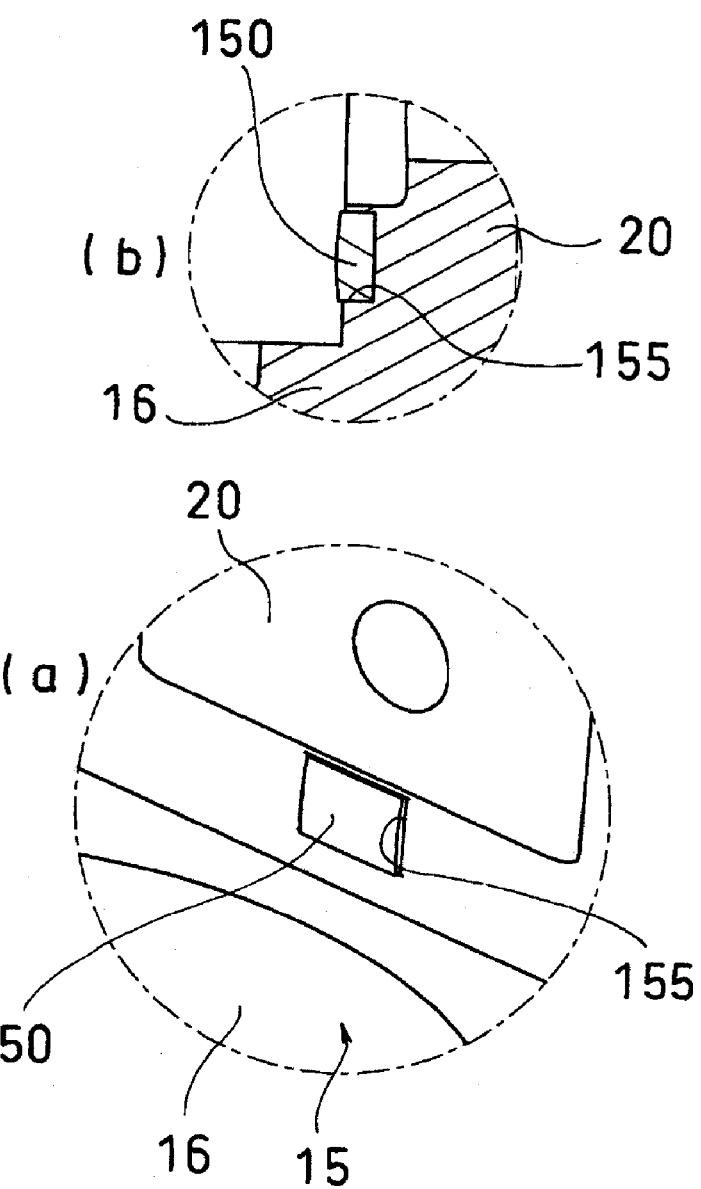
FIG. 6 shows drawings depicting a further attaching method of a guide member to the trunnion, of which (a) is a perspective view of a main part of the trunnion, and (b) is a vertical sectional view of the main part of the trunnion.

In addition, as is shown in FIG. 6, a substantially quadrangular plate-shaped recessed portion 155 is provided on the internal surface of the bent wall portion 20 of the trunnion 15, and the guide member 150 is inserted into the recessed portion 155.

In this embodiment, since the guide surface portions 120 are formed on the guide members 150 which are separate from the trunnion 15 and the pair of guide members 150, 150 are attached to the trunnion 15, in the event that the guide surface portion 120 become necessary to be replaced due to getting worn, the trunnion 15 does not have to be replaced but only the guide members 150 may be replaced. In addition to this, the same function and advantage as those of the first embodiment can be provided In addition, in this embodiment, while the crowing is provided on the guide surface portions 120 of the guide members 150, instead of this, a crowning may instead be provided on the outer circumferential surface 110 of the outer ring main body portion 28a, and furthermore, crownings may be provided on both of them. The crowning may be in the form of an end portion crowning or a full surface crowning.

Figure 7:
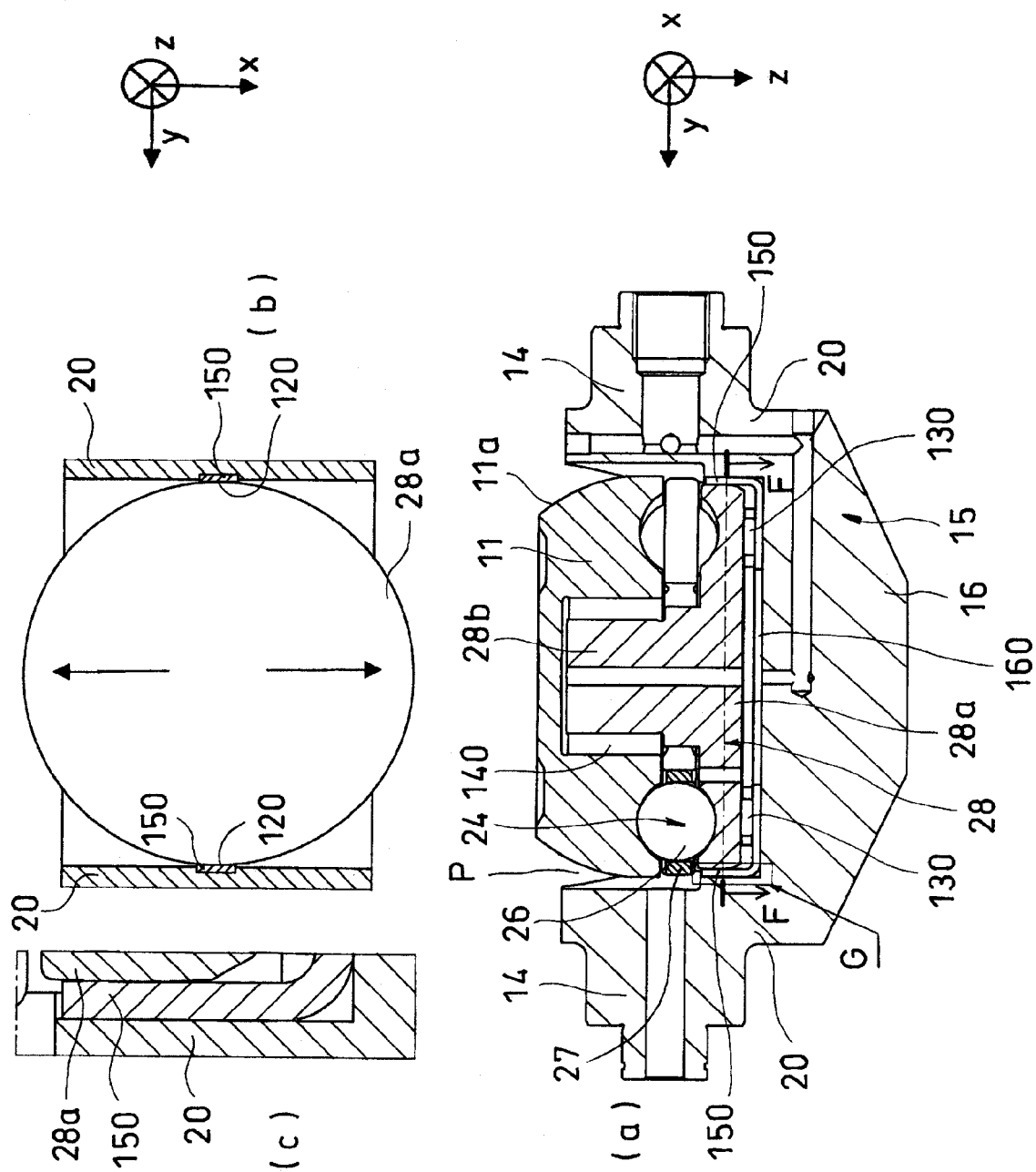
FIG. 7 shows drawings depicting a toroidal continuously variable transmission unit according to a third embodiment of the invention, of which (a) is a sectional view of a main part, (b) is a sectional view taken along the line F-F in (a), and (c) is an enlarged view of a portion G in (a).
Figure 8:
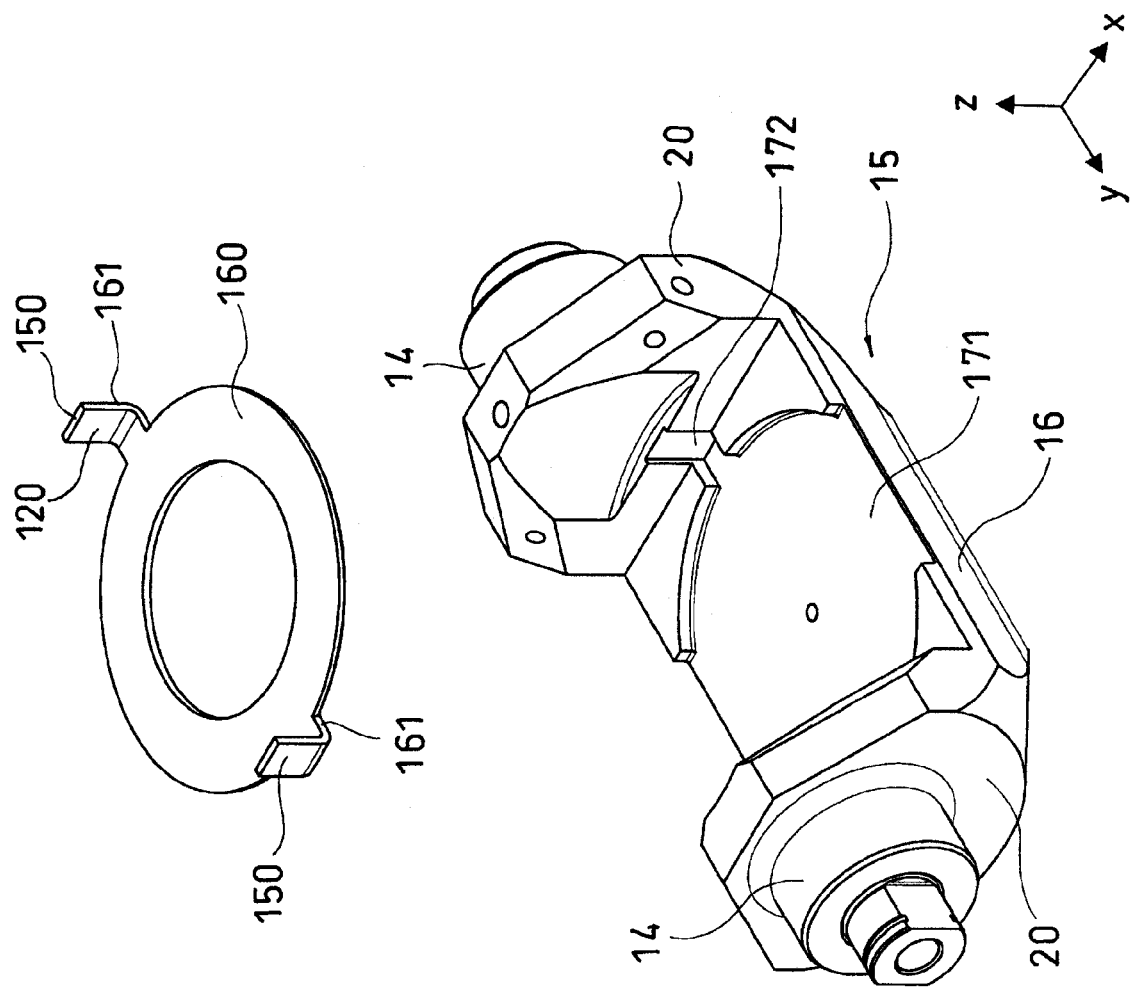
FIG. 8 is an exploded perspective view depicting a trunnion and a bearing ring.
Figure 9:
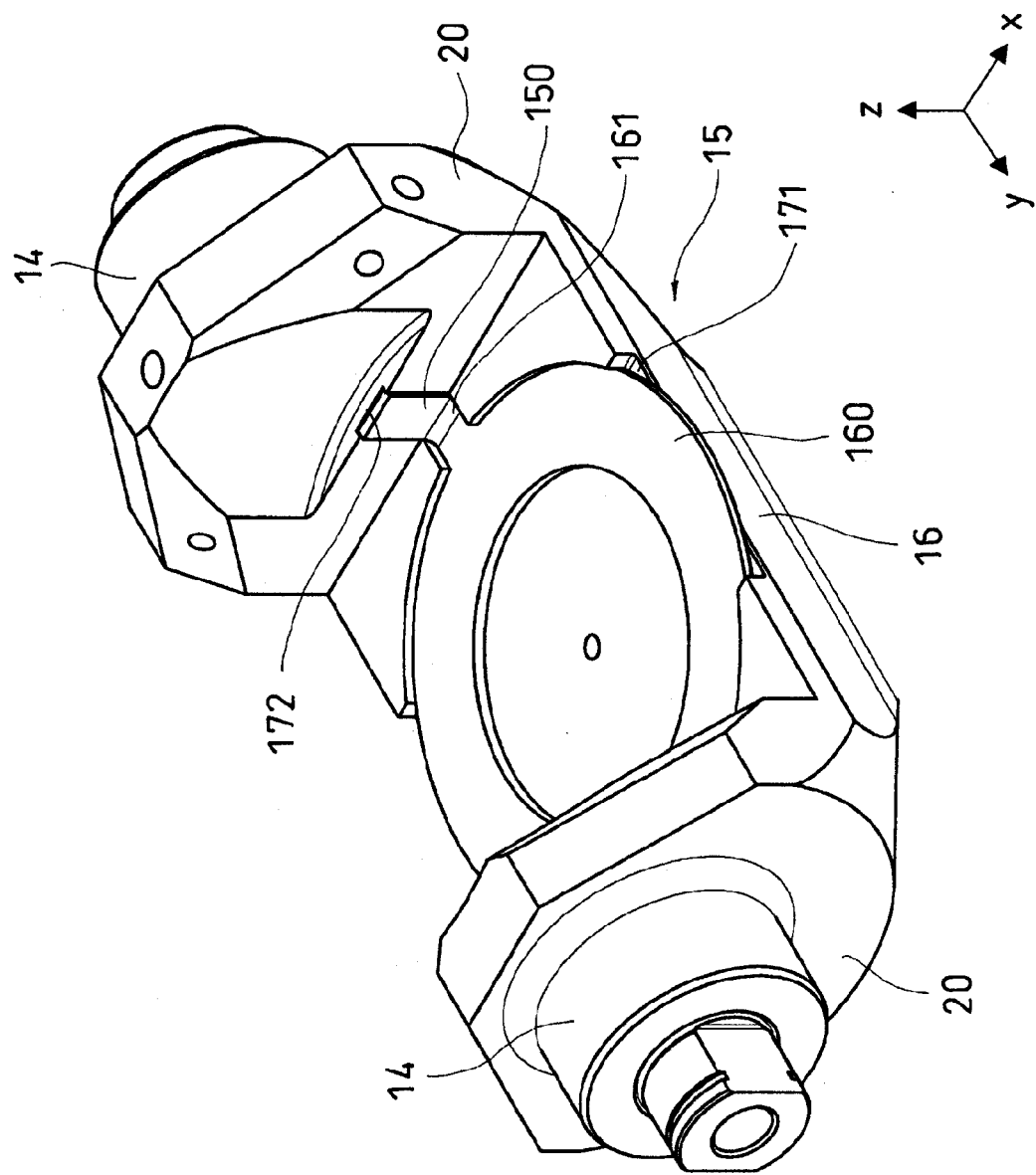
FIG. 9 is a perspective view depicting a state in which the bearing ring is fitted in the trunnion.

FIGS. 7 to 9 show a third embodiment of the invention. In this embodiment, a pair of quadrangular plate-shaped guide members 150, 150 are formed integrally with an annular disc-shaped bearing ring 160 of a thrust rolling bearing (a thrust bearing) 130. Namely, a pair of projecting pieces 161, 161, which are made to project outwards into an L-shape as viewed in cross section, are provided on an outer circumferential surface of the bearing ring 160 in positions which are symmetry with respect to point, and quadrangular plate-shaped vertical portions of the respective projecting pieces 161, 161 constitute the guide members (guide portions) 150, 150. Internal surfaces which are made up of quadrangular planes of the respective guide members 150, 150 constitute guide surfaces 120, 120, respectively.

As has been described before, the thrust rolling bearing 130 is interposed between a trunnion 15 and an outer ring main body portion 28a, so as to bear a load applied to a power roller 11 in a thrust direction (a direction directed from a small end face side to a large end face side of the power roller 11). This thrust rolling bearing 130 is made up of a thrust needle bearing (a thrust bearing) and rolls on surfaces of respective raceways which are formed by an external surface of the outer ring main body portion 28a and the bearing ring 160. Although needle rollers of the thrust needle bearing may be disposed in one direction, the needle rollers are preferably disposed in a radial fashion. The bearing ring 160 is fitted in a recessed portion 171 formed on an internal surface of a support plate portion 16 of the trunnion 15, and the pair of projecting pieces 161, 161 which are provided on the bearing ring 160 are fitted, respectively, in recessed portions 172 which are formed from the internal surface of the support plate portion 16 as far as internal surfaces of bent wall portions 20 of the trunnion 15 so as to have an L-shape section.

A crowning is provided on an outer circumferential surface 110 of the outer ring main body portion 28a. Since the other configurations including the configuration of a pair of guide surface portions 120, 120 are similar to those of the second embodiment, like reference numerals are imparted to like constituent elements, and the description thereof is omitted herein.

In this embodiment, since the guide members 150 having the guide surface portions 120 are provided integrally on the bearing ring 160 of the thrust rolling bearing 130, the number of parts can be reduced, thereby making it possible to reduce the manufacturing costs. In addition, the same function and advantage as those of the second embodiment can be provided.

In addition, in this embodiment, while the crowing is provided on the outer circumferential surface 110 of the outer ring main body portion 28a, instead of this, a crowning may be provided on the guide surface portions 120 of the guide members 150 and furthermore, crownings may be provided on both of them. The crowning may be in the form of an end portion crowning or a full surface crowning.

Figure 10:
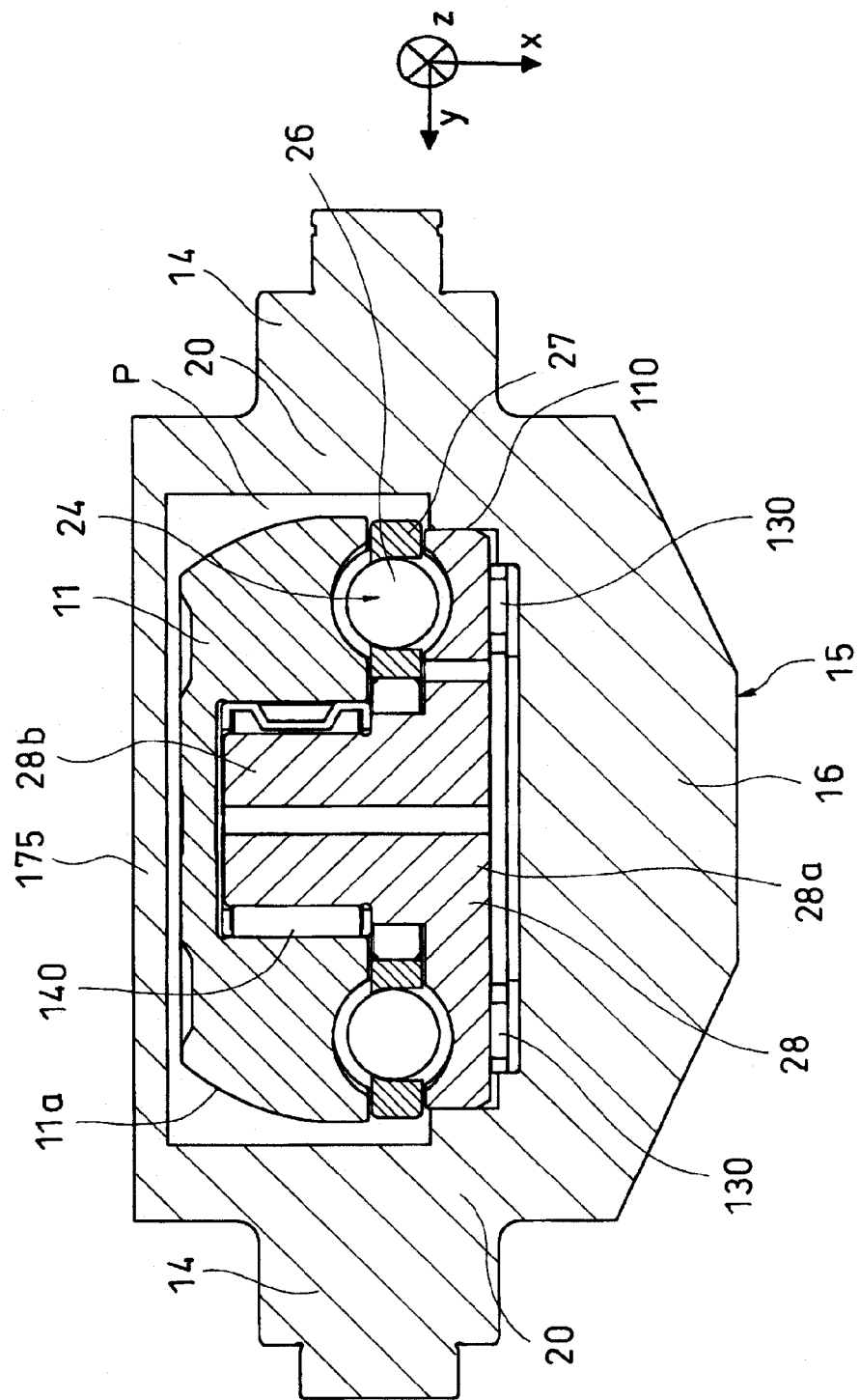
FIG. 10 is a drawing depicting a toroidal continuously variable transmission unit according to a fourth embodiment of the invention, which is a sectional view of a main part.
Figure 11:
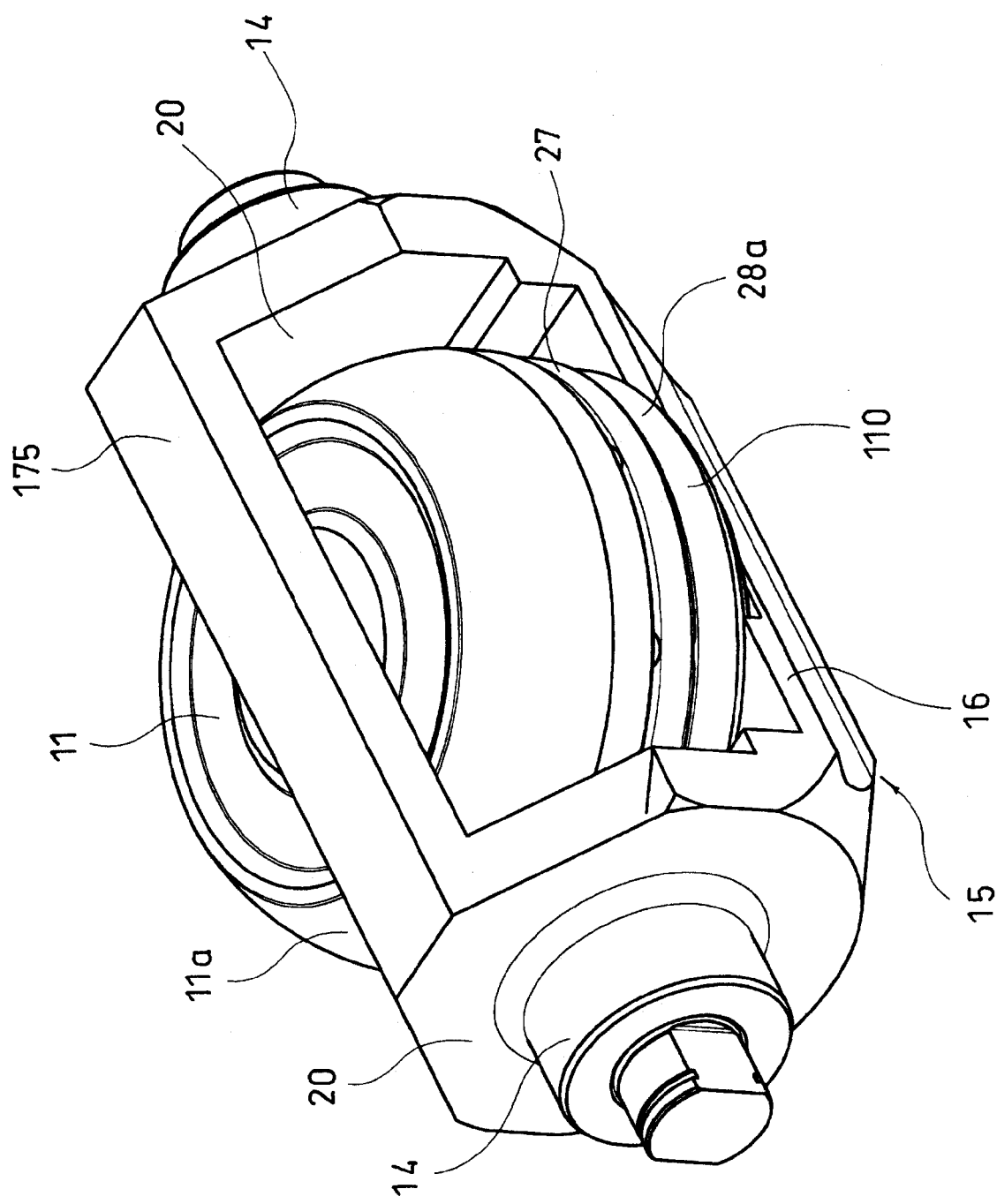
FIG. 11 is a perspective view depicting the toroidal continuously variable transmission unit according to the fourth embodiment of the invention.

FIGS. 10 and 11 show a fourth embodiment of the invention. In this embodiment, a connecting portion 175, which connects distal end portions of a pair of bent wall portions 20, 20 at both longitudinal end portions of a support plate portion 16 of a trunnion 15 to each other, is formed integrally on the trunnion 15. Since the other configurations including the configuration of a pair of guide surface portions 120, 120 are the same as those of the first embodiment, like reference numerals will be imparted to like constituent elements, so as to omit the description thereof.

In this embodiment, since the distal end portions of the pair of bent wall portions 20, 20 of the trunnion 15 are configured to be connected together by the connecting portion 175, the rigidity of the trunnion 15 can be increased. Furthermore, even in the event that the connecting portion 175 is formed integrally with the trunnion 15, a power roller 11, an outer ring 29 with a shaft portion 28b and the like can be inserted from a side of the trunnion 15 so as to be disposed between the support plate portion 16, the pair of bent wall portions 20, 20 and the connecting portion 175, and consequently, an attaching means for attaching the connecting portion 175 can be omitted, and the rigidity of the trunnion 15 can be increased inexpensively.

Note that the connecting portion 175 may be prepared separately of the pair of bent wall portions 20, 20, so as to be extended between the pair of bent wall portions 20, 20.

Figure 12:
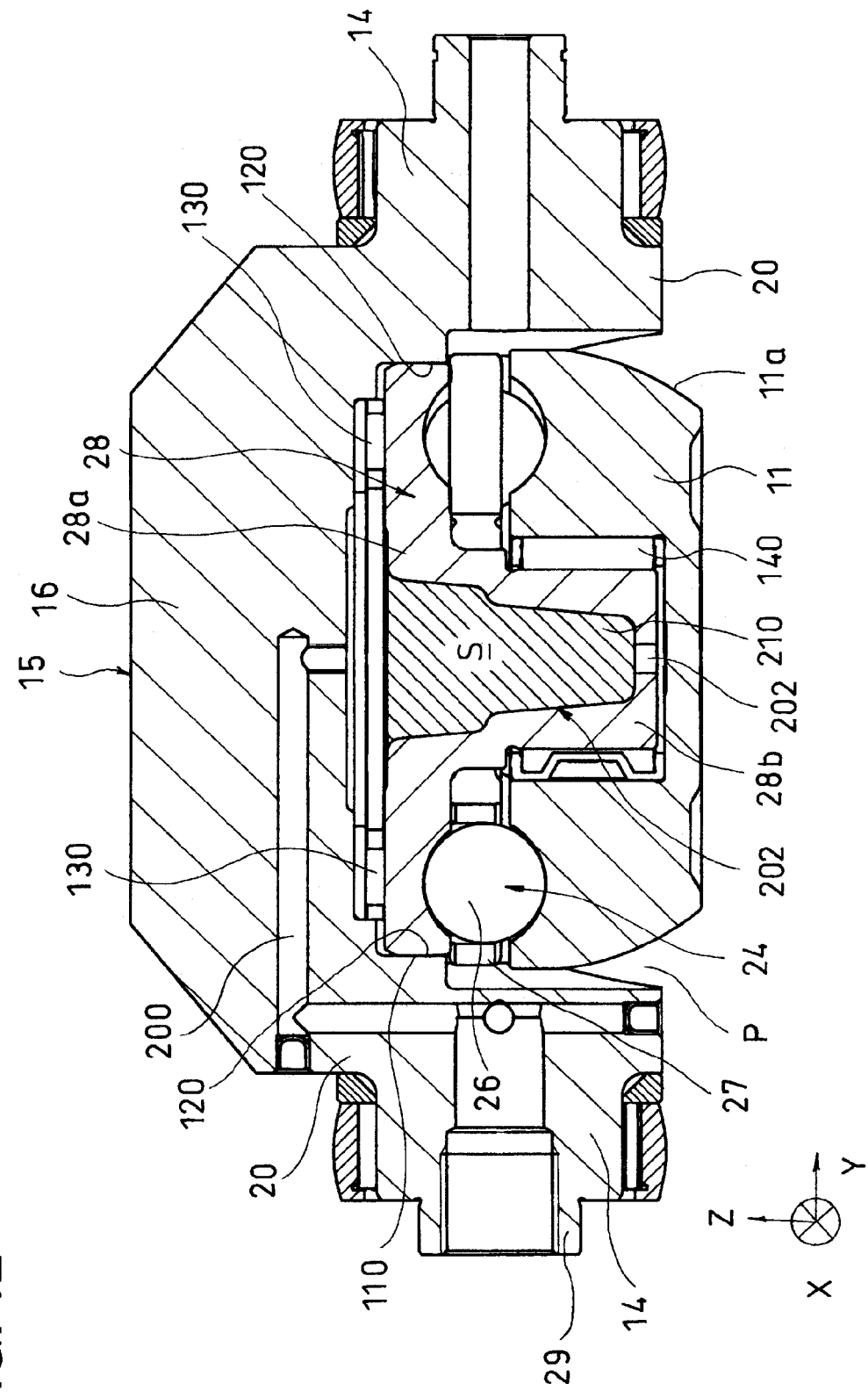
FIG. 12 is a sectional view depicting a main part of a toroidal continuously variable transmission unit according to a fifth embodiment of the invention.
Figure 13:
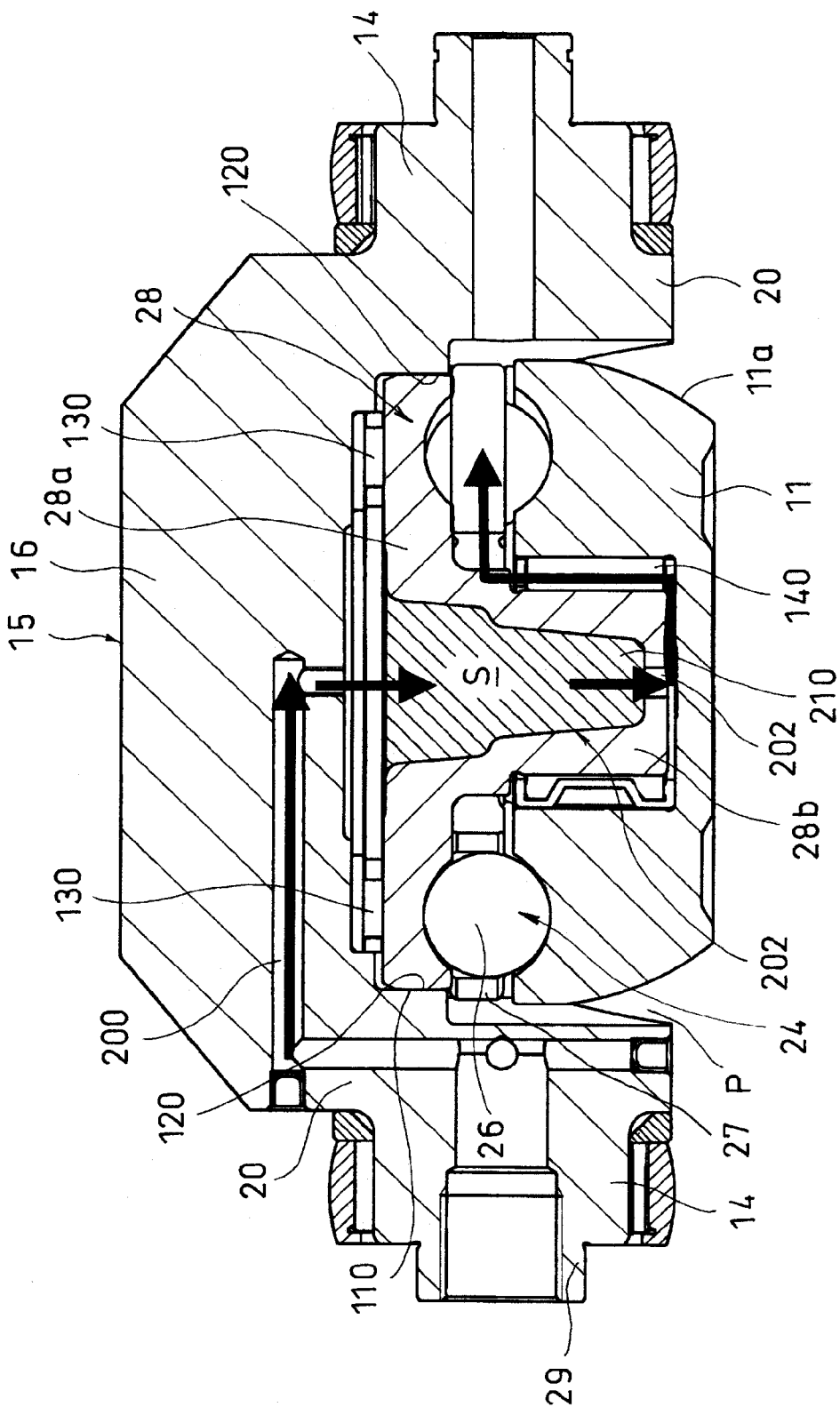
FIG. 13 is a sectional view depicting a supply path of lubricating oil in the configuration depicted in FIG. 13.

FIGS. 12 and 13 show a fifth embodiment. In this embodiment, an oil supply path 200 is formed in a trunnion 15 for supplying lubricating oil to a portion (facing oppositely an outer ring 28) which reaches a pocket P. This oil supply path 200 extends from a drive rod 29 which communicates with an interior of a drive cylinder 31. In addition, an oil path 202, which communicates with the oil supply path 200, is formed in the outer ring 28. This oil path 202 extends in an axial direction from an end face of an outer ring main body portion 28a which faces oppositely an end portion of the oil supply path 200 to an end face of a shaft portion 28b, and part thereof (in this embodiment, almost all of the oil path 202 excluding a portion lying in the vicinity of an end portion of the shaft portion 28b) is formed as a wide recessed space S which is largely widened in a radial direction. In addition, a filter 210 is mounted in this recessed space S for removing foreign matters in the lubricating oil.

In the configuration described above, as is shown in FIG. 13, after foreign matters therein have been removed by the large filter 210 mounted in the recessed space S in the outer ring 28, the lubricating oil supplied from the oil supply path 200 flows as is indicated by an arrow from the end portion of the shaft portion in the oil path 202 to a radial rolling bearing 140 via a gap between the shaft portion 28b and a small end face side of a power roller 11 and is then supplied therefrom to a thrust ball bearing 24.

Thus, as has been described heretofore, in this embodiment, when a tangential force is applied to the power roller 11, an outer circumferential surface of the outer ring 28 and a guide surface portion 120 of the trunnion 15 are brought into abutment with each other, whereby the power roller 11 is allowed to roll on the guide surface portion 120 so that a pressing force is made to be transmitted from an input-side disc to an output-side disc. Thus, since the shaft portion 28b of the outer ring 28 constitutes a portion which does not contribute to strength, rigidity and function, by providing the recessed portion S in the outer ring 28, or providing the recessed portion particularly in the shaft portion 28b, the recessed portion S can be secured largely without causing any problem with strength, rigidity and function. Consequently, the filter 210 which is large in size can be mounted in the recessed portion S. As a result, the occurrence of clogging in the filter 210 can be reduced, and the weight of the outer ring 28 can be reduced by the amount by which the recessed portion S is provided, thereby making it possible to reduce the trunnion and power roller system as a whole.

In addition, in this embodiment, since the recessed portion S extends in the axial direction from the outer ring main body portion 28a as far as the shaft portion 28b, an inner volume of the recessed portion S can be secured largely to a maximum extent, whereby not only can the occurrence of clogging in the filter 210 be reduced further, but also the reduction in weight of the whole trunnion and power roller system can be promoted.

In addition, in this embodiment, a pair of guide surface portions 120, 120 are provided on the trunnion 15 so as to face oppositely each other and to extend along a twisted direction which intersects a rotational center axis (a rotational axis) of the power roller 11, and when a tangential force is applied to the power roller 11 in a radial direction, an outer circumferential surface 110 of the outer ring main body portion 28a of the outer ring is brought into abutment with one of the guide surface portions 120, 120, and the outer ring main body portion 28a is allowed to roll on the guide surface portion 120, whereby the outer ring 28 and hence the power roller 11 slide along a rotational center axis of the discs 2, 3. Consequently, the power roller 11 together with the outer ring 28 can be rolling guided smoothly with a small friction resistance relative to the trunnion 15 while avoiding the offsetting of the shaft portion which supports the power roller 11, whereby the pressing force can smoothly be transmitted from the input-side disc 2 to the output-side disc 3. In addition, since the function and advantage described above can be realized only by providing the pair of guide surface portions 120, 120 on the trunnion 15, the construction is made simple, and a number of machining steps requiring high accuracy does not have to be involved (since the shaft portion which supports the power roller does not have to be offset), whereby a good machinability is provided and the machining costs are reduced.

In addition, this patent application is based on Japanese Patent Application (No. 2006-180390) filed on Jun. 29, 2006, Japanese Patent Application (No. 2006-238309) filed on Sep. 1, 2006, Japanese Patent Application (No. 2007-47102) filed on Feb. 27, 2007, and Japanese Patent Application (No. 2007-142917) filed on May 30, 2007, and the contents thereof are incorporated herein to their entireties by reference.

The invention can applied to single-cavity and double-cavity toroidal continuously variable transmission units in various forms.

The invention claimed is:
1. A toroidal continuously variable transmission unit comprising:
   an input-side disc and an output-side disc which are supported coaxially with each other and rotatably so that internal surfaces thereof are made to face each other;
   power rollers held between the input-side disc and the output-side disc;

trunnions which are arranged in a twisted position relative to rotational center axes of the input-side disc and the output-side disc, each oscillate about a pair of pivot shafts which are provided coaxially with each other, and supported rotatably the respective power rollers; and thrust bearings each comprising:

an inner ring made up of the power roller;

an outer ring; and rolling elements which roll between the inner ring and the outer ring, wherein the thrust bearings support a load applied to the power roller in a thrust direction, wherein a pair of guide surface portions are provided on the trunnion which face oppositely each other and extend in a direction which intersects the rotational center axis of the power roller at right angles and intersects the pivot shafts at right angles, so that an outer circumferential surface of the outer ring is adapted to be brought into abutment with the guide surface portion when a tangential force is applied to the power roller in a direction which follows along the pivot shafts.

2. The toroidal continuously variable transmission unit as set forth in claim 1, wherein the guide surface portions are formed integrally on the trunnion.

3. The toroidal continuously variable transmission unit as set forth in claim 1, wherein the guide surface portions are formed on guide members provided on the trunnion.

4. The toroidal continuously variable transmission unit as set forth in claim 3, wherein the guide members are formed integrally with a thrust bearing member which is provided between the outer ring and the trunnion.

5. The toroidal continuously variable transmission unit as set forth in claim 1, wherein a crowning is provided on at least either of the guide surface portions and the outer circumferential surface of the outer ring.

6. The toroidal continuously variable transmission unit as set forth in claim 1, wherein the trunnion comprises:

a support plate portion;

a pair of bent wall portions which are formed at both end portions along a direction of the pivot shafts of the support plate portion so as to be bent towards an internal surface side of the support plate portion; and a connecting portion which connects distal end portions of the pair of bent wall portions to each other, and the power roller is disposed among the support plate portion, the pair of bent wall portions and the connecting portion.

7. The toroidal continuously variable transmission unit as set forth in claim 1, wherein the trunnion comprises:

a support plate portion; and a pair of bent wall portions which are formed at both end portions along a direction of the pivot shafts of the support plate portion so as to be bent towards an internal surface side of the support plate portion, an accommodation space for accommodating the outer ring and the power roller is formed by an internal surface of the support plate portion and the pair of bent wall portions, and in the accommodation space, a dimension along the direction of the pivot shafts of an outer ring accommodation space for accommodating the outer ring is set smaller than a dimension along the pivot shafts of a power roller accommodation space for accommodating the power roller.

8. The toroidal continuously variable transmission unit as set forth in claim 1, wherein the outer ring comprises:

an outer ring main body portion which makes up an outer ring portion of the thrust bearing and a shaft portion which extends substantially vertically from the outer ring main body portion for supporting the power roller rotatably, a recessed portion, which forms part of an oil path for supplying lubricating oil to the thrust bearing, is provided in the outer ring, a filter is mounted in an interior of the recessed portion for removing foreign matter in the lubricating oil.

9. The toroidal continuously 'variable transmission unit as set forth in claim 8, wherein the recessed portion extends in an axial direction from the outer ring main body portion as far as the shaft portion.

* * * * *